(12) United States Patent
Mckiel, Jr.

(10) Patent No.: US 9,507,561 B2
(45) Date of Patent: Nov. 29, 2016

(54) METHOD AND APPARATUS FOR FACILITATING USE OF TOUCHSCREEN DEVICES

(71) Applicant: VERIZON PATENT AND LICENSING INC., Basking Ridge, NJ (US)

(72) Inventor: Frank A. Mckiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 216 days.

(21) Appl. No.: 13/838,603

(22) Filed: Mar. 15, 2013

(65) Prior Publication Data

US 2014/0282002 A1    Sep. 18, 2014

(51) Int. Cl.
*G06F 3/16* (2006.01)
*G06F 3/0488* (2013.01)
*G06F 1/16* (2006.01)

(52) U.S. Cl.
CPC ............ *G06F 3/167* (2013.01); *G06F 1/1632* (2013.01); *G06F 3/04883* (2013.01); *G06F 1/1626* (2013.01); *G06F 2200/1633* (2013.01); *G06F 2200/1636* (2013.01); *G06F 2203/04808* (2013.01)

(58) Field of Classification Search
None
See application file for complete search history.

(56) References Cited

U.S. PATENT DOCUMENTS

| | | | | |
|---|---|---|---|---|
| 6,115,482 | A * | 9/2000 | Sears et al. | 382/114 |
| 7,653,544 | B2 * | 1/2010 | Bradley et al. | 704/270.1 |
| 7,757,173 | B2 * | 7/2010 | Beaman | 715/727 |
| 7,765,496 | B2 * | 7/2010 | Bernstein | 715/865 |
| 8,239,784 | B2 * | 8/2012 | Hotelling et al. | 715/830 |
| 8,768,702 | B2 * | 7/2014 | Mason et al. | 345/177 |
| 2003/0234824 | A1 * | 12/2003 | Litwiller | 345/865 |
| 2008/0163062 | A1 * | 7/2008 | Lee et al. | 715/727 |
| 2011/0110534 | A1 * | 5/2011 | Lindahl | G06F 3/0482 381/107 |
| 2011/0205169 | A1 * | 8/2011 | Yasutake | 345/173 |
| 2013/0222230 | A1 * | 8/2013 | Choi et al. | 345/156 |
| 2013/0278552 | A1 * | 10/2013 | Kamin-Lyndgaard | 345/174 |
| 2014/0106814 | A1 * | 4/2014 | Schmidt | H04W 88/02 455/556.1 |
| 2014/0164894 | A1 * | 6/2014 | Bellamy et al. | 715/209 |
| 2014/0200054 | A1 * | 7/2014 | Fraden | 455/575.8 |

* cited by examiner

*Primary Examiner* — Jeffrey A Gaffin
*Assistant Examiner* — Nhat-Huy T Nguyen

(57) ABSTRACT

Exemplary embodiments are described wherein an auxiliary sensor attachable to a touchscreen computing device provides an additional form of user input. When used in conjunction with an accessibility process in the touchscreen computing device, wherein the accessibility process generates audible descriptions of user interface features shown on a display of the device, actuation of the auxiliary sensor by a user affects the manner in which concurrent touchscreen input is processed and audible descriptions are presented.

19 Claims, 24 Drawing Sheets

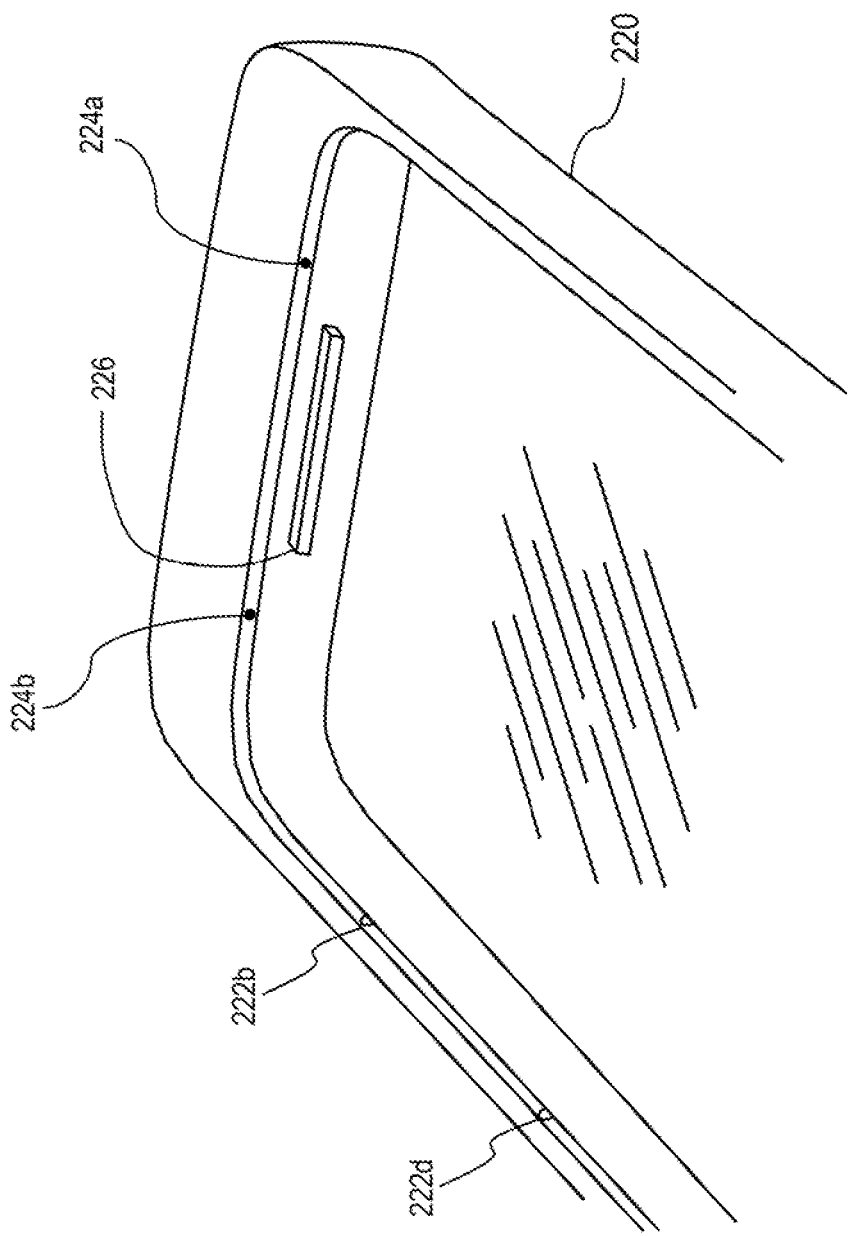

900

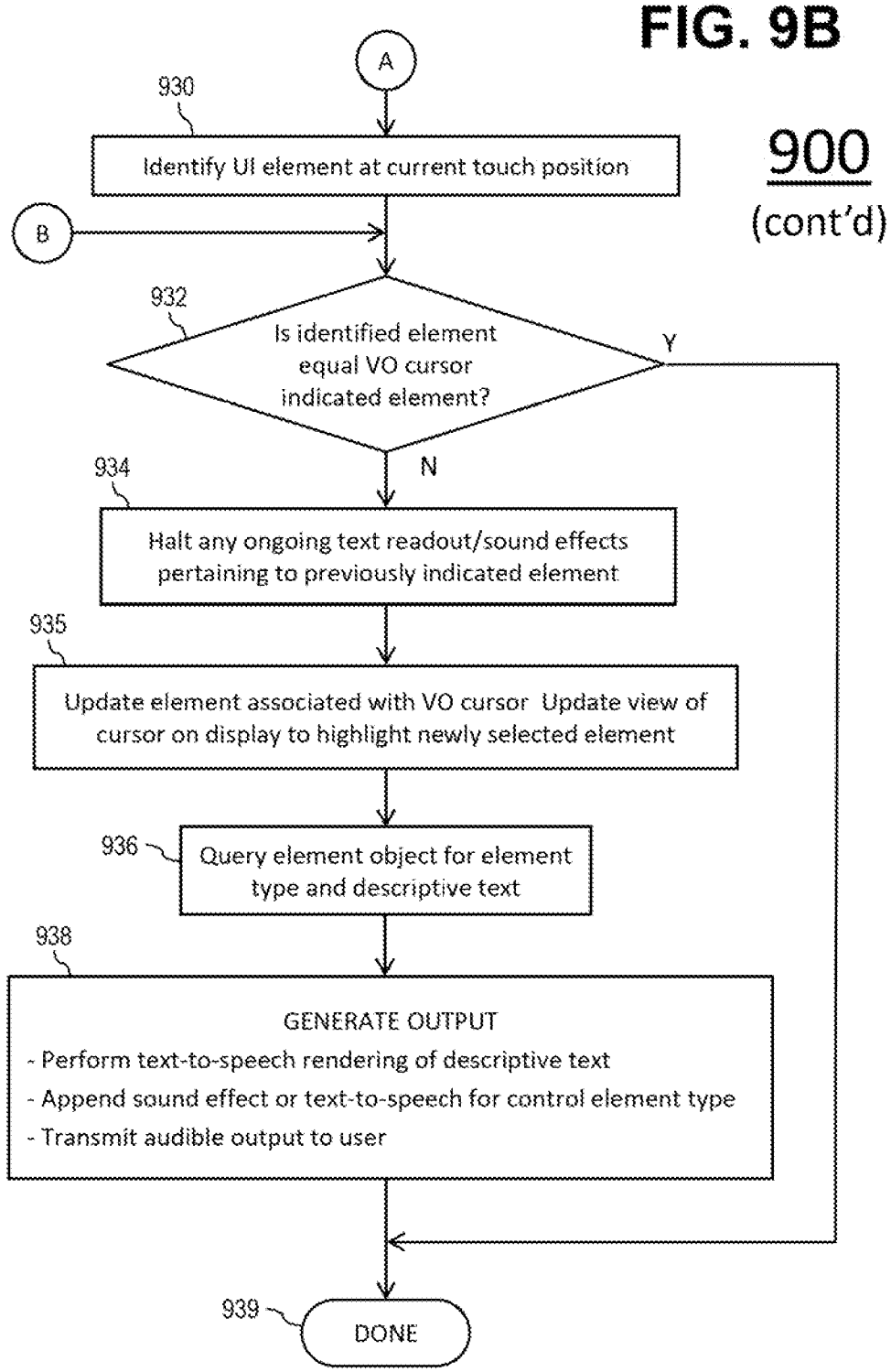

METHOD AND APPARATUS FOR FACILITATING USE OF TOUCHSCREEN DEVICES

BACKGROUND INFORMATION

In recent years, mobile communication and computing devices using touch-sensitive displays, such as the 'iPhone'™ and iPad™ products from Apple Inc., have become commonplace. Users are typically able to directly manipulate graphically-depicted interactive elements on the user interface display by placing one or more fingertips in contact with the screen and making gestures such as tapping, sliding and pinching. Touchscreens typically comprise transparent, capacitance-sensing layers and, using well-known techniques, can sense the position of multiple simultaneous points of contact between a user's fingers and the display surface. In terms of interaction with graphical interface elements, users can simulate typing on a displayed keyboard, select icons to open applications, select text fields for subsequent textual input and scroll through lists or other contents. With many such devices, users may even scroll an entire 'home screen' or 'desktop' that displays an array of icons that each represent an application to launch or a feature to invoke.

Touchscreen devices like the iPhone and other so-called 'smartphones' rely mainly upon the visual display and touchscreen to support user interaction and consequently provide minimal physical buttons or other input mechanisms for which a user could employ tactile sense to locate and actuate. This minimization of mechanical buttons makes the user interface heavily software-driven and graphically-oriented. In some cases, however, as the finite number of gestures that are intuitive, easily remembered and readily discernible are dedicated to specific interactions, the gesture mappings become quickly exhausted. This is especially true when accessibility tools are layered on top of normally used touchscreen paradigms. Furthermore, where nearly every user interaction must take place via the touchscreen, a user who wants to freely alter some functional attribute of the device or an application must navigate through a menu hierarchy to reach a particular setting and is thus impeded from making momentary or dynamic changes to certain settings.

Blind users of such touchscreen devices are unable to see user interface elements displayed on the screen, such as simulated keyboard keys, icons, buttons and the like. However, some accommodations have been introduced, such as Apple's 'VoiceOver' accessibility feature, so that sound effects or synthesized speech inform a blind user of content or controls that correspond to the position of the user's finger as they touch the screen. To support this, application developers add descriptive textual labels in their application's interfaces so that, ideally, each visual page or control element also has a corresponding textual description that can be announced to a user by speech synthesis. Even without seeing the display, a user can probe the display and elicit audible responses until finding a desired function or control or content.

In addition to applications providing descriptive labels for the displayed elements, additional measures have been instituted to discriminate a single-point touching gesture used by a blind user to explore the display from a similar single-touch that would normally signify intent launch an application or act upon a control element, such as a displayed pushbutton control. As an example of this disambiguation, Apple's VoiceOver accessibility mode notably shifts the interpretation of touchscreen gestures.

Normally, in the case where a sighted user wishes to launch an application, the user locates a corresponding icon on the home screen, selected based on the icon's visual appearance suggesting its function, and then simply taps the icon once with their fingertip. The 'tap' gesture is easy to directly target with one's finger given the size and spacing of the icons.

When the 'VoiceOver mode' is active, however, the user's single-fingered input is assumed to be an attempt to probe the environment and elicit descriptive sounds. Without this provision, a blind user's attempt to merely explore the displayed icons could not be distinguished from an intent to invoke an application or otherwise act upon touchscreen-actuated visual elements. In order for a user, during VoiceOver mode, to actually take action upon an element in the same way a single-tap gesture would normally work, the user must instead perform a 'double-tap'. To be more specific, the user typically performs a preparatory exploration of the interface by touching the screen in various locations and hearing descriptive sounds for elements displayed under their fingertips. As various elements are contacted, a VoiceOver 'cursor' is shifted around to highlight the currently or most recently contacted element for which a sound was elicited.

Once the VoiceOver cursor has been used to select a user interface element, the user may subsequently execute a double-tap gesture anywhere on the screen to activate the selected control. The double-tap gesture anywhere an the screen will perform the same action that a single-tap directed at the selected element would have performed if VoiceOver mode were not active. Thus, with VoiceOver mode active, single-touch gestures effectively become intercepted and used for exploratory interaction whereas double-tap gestures are, in effect, converted to single-tap gestures as if executed upon the element that is currently highlighted.

The VoiceOver mode also entails modification of other user inputs via the touchscreen. A scrolling action, typically performed by a single finger sliding in a scroll direction, also has to be disambiguated from the motion of simply sliding around to find displayed features without activating them. Accordingly, while in VoiceOver mode, scrolling is only engaged when three fingers come into contact with the screen. (As will be described below, two-fingered gestures are used to control page-wise reading.)

While the above measures provide basic accessibility of touchscreen interfaces to blind or low-vision users, further improvements may be realized in terms of agility, prudent assignment of gestures to functions and ease of use, as well as in facilitating a common experience to be shared among both sighted and blind users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2B is a close-up view of a housing showing the placement of optical elements along the bezel of the housing in accordance with an exemplary embodiment that comports with principles described herein.

FIGS. 9A-9D collectively illustrate a typical process for receiving gestural input from a touchscreen and generating corresponding audible output as executed by an audible accessibility function.

DETAILED DESCRIPTION OF PREFERRED EMBODIMENTS

Example devices and methods described herein provide for one or more additional touch-sensing inputs, external to a touchscreen device, to augment use of the device's own touchscreen and other controls. In an example application of the present description to benefit blind and low-vision users, the additional touch-sensing inputs may be usefully applied to dynamically affect the manner in which contemporaneous gestures on the device's touchscreen are interpreted and handled by the device. Preferred embodiments comporting with principles described herein involve the additional touch-sensing areas being substantially alongside, coplanar or contiguous with the device's own touchscreen surface.

Embodiments according to principles described herein preferably operate in the context of a touchscreen-equipped computing device which comprises at least one touch-sensitive display, at least one audio subsystem for producing audio signals and at least one output for audio signals and which executes at least one process to provide a user interface and receives user input to the user interface via the touch-sensitive display. Embodiments according to principles described herein include a method of, from an auxiliary sensor device that is separate from, but physically attached to, the computing device, receiving at the computing device a communication indicating an actuation state of the auxiliary sensor device; at the computing device, receiving a touch gesture from a user via the touch-sensitive display; responsive to the touch gesture, outputting a first audio signal if the actuation state of the auxiliary sensor device corresponds to a first state; and, as an alternative response to the touch gesture, outputting a second audio signal, different from the first audio signal, if the actuation state of the auxiliary sensor device corresponds to a second state different from the first state.

One or more of the illustrative embodiments described below involve a method comprising, at a computing device, receiving a touch gesture from a user via a touchscreen coupled to the computing device and, from an auxiliary sensor device that is removably attached to the computing device, receiving at the computing device a communication indicating an actuation state of the auxiliary sensor input device. The illustrative method further involves, responsive to the touch gesture, producing a first audio signal from the computing device if the actuation state of the auxiliary sensor device corresponds to a first state and producing an alternative second audio signal if the actuation state of the auxiliary sensor device corresponds to a second state different from the first state.

Figure 1:
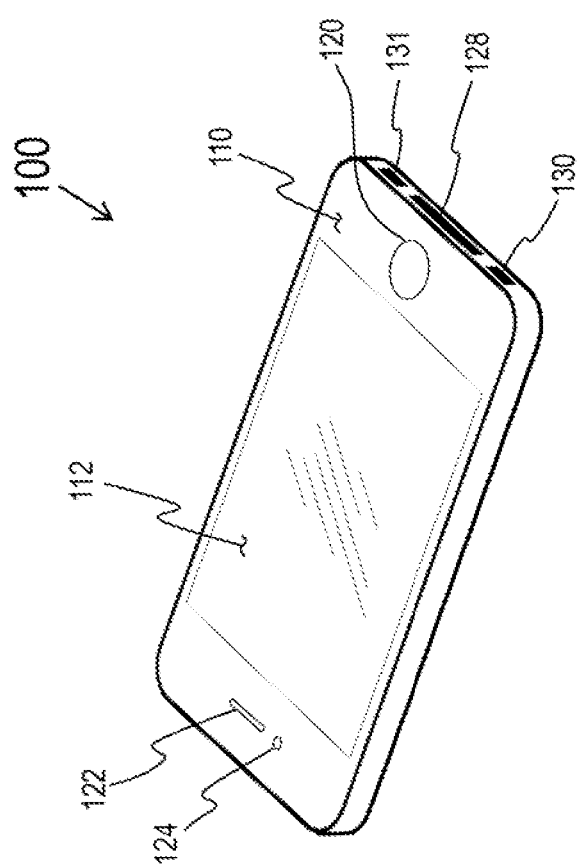
FIG. 1 is a pictorial illustration of a typical touchscreen device.

FIG. 1 shows a typical mobile computing device 100 (which may also be referred to as a 'host device' or 'touchscreen device') as an example of the type to which principles described herein may be advantageously applied. Mobile computing device 100 may be, for example, an iPhone™ manufactured by Apple Inc. Mobile computing device 100 comprises a smooth, glasslike front surface 110, a portion of which is a touch-sensitive region (or simply 'touchscreen') 112 overlaying a visual display. The extents of touch-sensitive region 112, which are typically also the limits of the underlying display, correspond to an area of front surface 110 that is sensitive to contact by a user's fingertip, or any other pointer that exhibits the permittivity, electrical conductivity or other electrical/mechanical characteristics that the touchscreen uses to sense a user's fingertip.

It should be noted from this diagram that there are some portions of front surface 110 that are not part of the displaying and touch-sensing region 112. Along those portions outside of the touchscreen 112 are placed, for example, a physical pushbutton 120, a sound output portal 122, and a front facing camera portal 124. (Mobile computing device 100 also typically has other pushbuttons protruding slightly from the outer perimeter of the device but these are not shown here for simplicity. These other pushbuttons typically include an on-off switch a silencing switch, and volume control pushbuttons.)

Mobile computing device 100 is shown to also have an electrical connector port 128 through which several types of connections may be made through a common connector. These connections provide for supplying charging power to the device, powering of external devices from the mobile computing device's battery, connections to analog audio devices, and connections for transferring data to and from the device. Additional sound portals 130, 131 are shown to be located alongside the connector 128. These sound portals may provide openings to an internal speaker for sound output or to a microphone for sound input, such as when the mobile computing device is used as a mobile telephone or sound recorder.

Figure 2A:
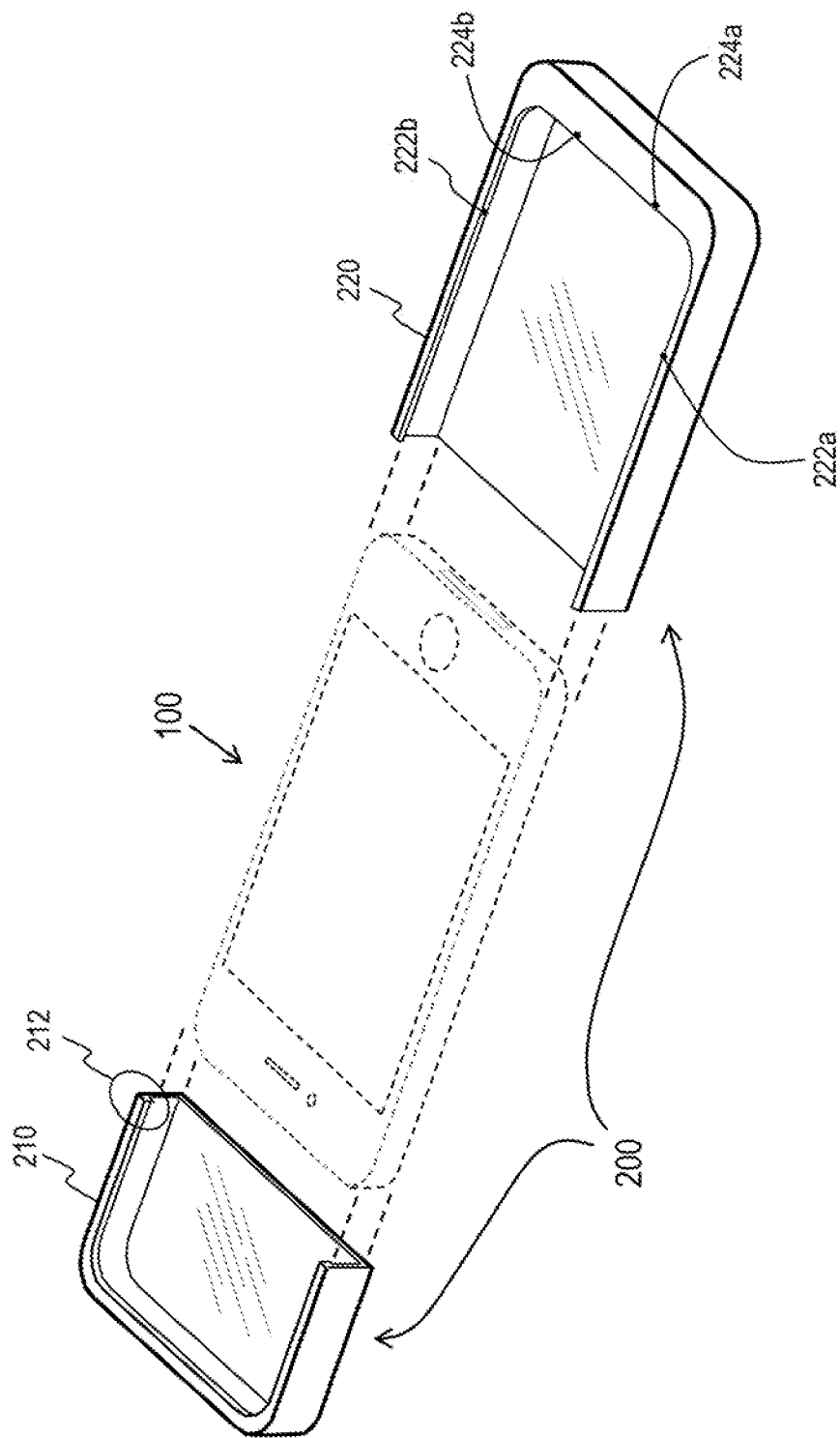
FIG. 2A is a pictorial of a housing which may attach to and partially enclose a touchscreen device in accordance with principles described herein.

FIG. 2A is a pictorial diagram showing the manner in which a mobile computing device 100 may be fitted with an outer housing 200 that partially surrounds device 100. Outer housing 200 will be explained below to incorporate components of an external sensor apparatus to augment user input to device 100. FIG. 2A shows one example design wherein outer housing 200 comprises top half 210 and bottom half 220, which both are formed with slightly recessed channels in their side walls to just fit snugly onto the computing device and slide towards one another until joined. This is one illustrative manner of removably attaching a housing to device 100.

One such commercially available housing that works in this manner is an external battery attachment for the iPhone called the 'juice pack'™ from Mophie, Inc. Note that each housing half comprises a slight bezel or lip 212 to slightly wrap around the edge of the mobile device and retain the mobile device snugly within the housing. In the commercially available Mophie product, these two housing halves slide together and are held towards one another by friction and interlocking tabs, which for clarity are not explicitly shown in this diagram. Furthermore, housing 200 may encompass additional openings on some surfaces to provide access to other controls and devices around the edge or one the backside of device 100, such as switches and cameras, which are not shown here for simplicity. In support of operating principles described herein, a number of light-emitting elements 222a and 222b are shown to be inset along the lip of lower housing half 220, along with some light-receiving elements 224a and 224b. The exact placement and number of these elements may vary according to design while still generally operating in accordance with principles described herein.

FIG. 2B shows a close-up view of a lower housing half 220, again depicting locations for possible locations for light-emitting elements such as 222b, and optionally 222d, as well as light-sensing elements 224a, 224b. FIG. 2B also shows the presence of an electrical connector 226 being set back within the recess of lower housing half 220 such that when mobile computing device 100 is inserted as was shown in FIG. 2A, electrical connector 226 mates with the electrical connector 128 of the mobile computing device. As will be explained further below, this connection may be used to provide power to external sensing circuitry disposed within housing 200 and to communicate to the mobile computing device 100 information-bearing signals generated by the external sensing device.

It should be noted that light-emitting or light-sensing components may also be disposed within upper housing half 210. Electrical coupling to such elements may be accomplished through mating electrical contacts between housing halves 210 and 220 or through a ribbon cable that interconnects the halves and is tucked inside of housing 200 when assembled around a device 100. Alternatively, points of light emission and light reception may be implemented within upper housing half 210 by setting the optical/electrical components within the lower housing half 220 and using internal-reflection light guides to extend optical paths from these components into the upper housing half 210. Light guides formed independently in housing halves 210,220 during manufacture may align and achieve optical continuity when the halves are assembled around device 100.

In alternative embodiments, housing 200 may comprise a single, flexible structure (created using well known processes) containing the components described above. In such a case, the housing may be designed to allow for stretching in certain areas to allow a mobile computing device 100 to be inserted into the housing 200 in a manner causing a snug fit for secure attachment. Other embodiments may use a housing 200 that is a single, rigid structure containing the components described above, but with a top portion that is open or openable (such as by a hinging area), such that a mobile computing device 100 may be slid into the housing 200 from the top portion in a manner causing a snug fit for secure attachment.

Figure 3:
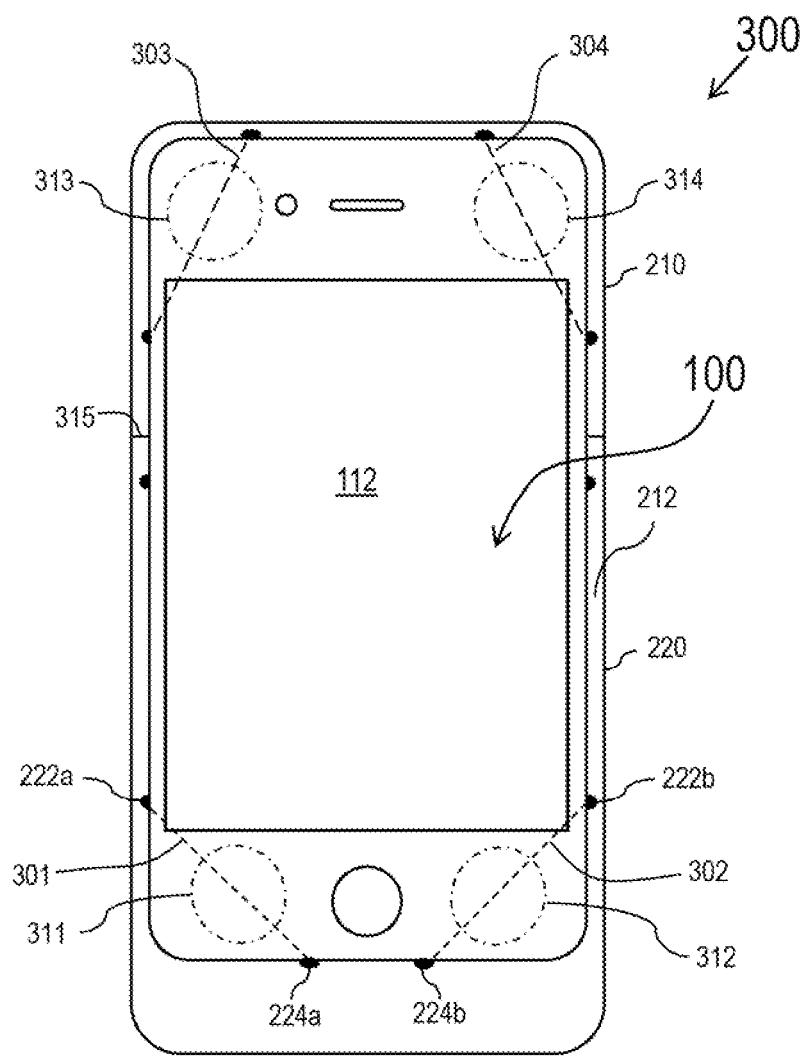
FIG. 3 illustrates a front view of a touchscreen device having a housing attached thereto and depicting areas of the device that may be rendered sensitive to user input in accordance with principles described herein.

FIG. 3 shows a front view 300 of a mobile computing device 100 to which the housing 200 has been removably attached and secured. The lip or bezel 212 of the housing can be seen to surround the front of the mobile computing device surface, preferably without significantly encroaching on the surface or impeding a user's ability to view or touch the surface. It is evident from parting line 315 in FIG. 3 that the exemplary lower housing half 220 and the exemplary upper housing half 210 have been slid together. FIG. 3 also conceptually depicts, using dotted lines 301, 302, pathways for light beams just above the surface of the mobile computing device and passing between, for example, a light-emitting element 222 and a light-receiving element 224. For example, as disposed along the edges of the bezel of lower housing half 220, as shown, paths for light between emitters 222 and corresponding receivers 224 are shown to cross over surface 110 in an area that is outside of touchscreen region 112. Additionally, other dotted lines 303, 304 indicate other potential locations for light paths between pairs of light emitters and light receivers properly situated along the bezel 212.

For reference, FIG. 3 also depicts the outline of several example regions of the surface of mobile computing device 100 that are typically non-touch-sensitive but which may optionally be rendered so in accordance with the present description. These sensing areas include areas 311, 312, 313 and 314 by virtue of light paths 301, 302, 303 and 304, respectively.

Figure 4:
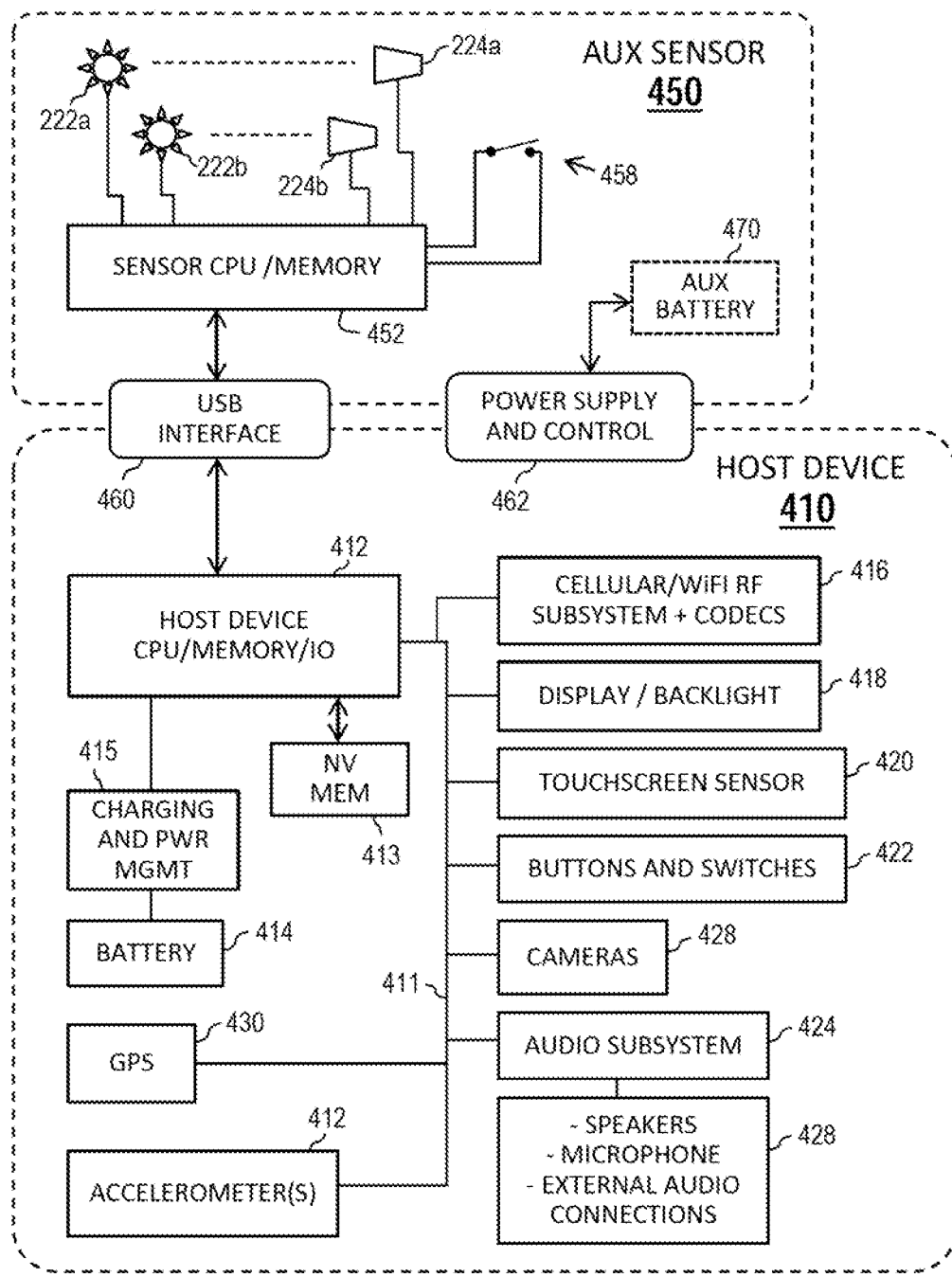
FIG. 4 is a block diagram describing hardware functional components both within a host device and an auxiliary sensor device in accordance with an exemplary embodiment that comports with principles described herein.

FIG. 4 provides a block diagram of the typical hardware elements within both a host device 410 (such as an iPhone) and an auxiliary sensor device 450 in accordance with an exemplary embodiment that comports with principles described herein. Host device 410 is shown to comprise a central processing unit as well as the associated memory and input/output circuitry supporting the CPU. These are referred to collectively as 'host CPU' 412. Host CPU 412 is also coupled to a nonvolatile data storage 413 which may be used for storing operating system, applications and other executable software, as weld as user data, even when no power is supplied from battery 414.

In the case where host device 410 is a mobile device, device 410 may include a battery 414, which is typically rechargeable and serves to provide power to all of the other circuits and subsystems shown in host device 410. The application of charging current to battery 414, as well as control of distribution of power from the battery to other components of host device 410 (which is particularly important in small mobile devices), is accomplished by one or more components that make up a charging and power management function 415.

Through its input/output interfaces, host CPU 412 interfaces to a variety of other components within host CPU 410. As shown these typically comprise, for example, a cellular and/or Wi-Fi RF subsystem along with hardware codecs 416; an LCD display along with a backlight for the display, shown collectively as reference 418; a touchscreen sensor 420 for detecting user input which overlays the display and provides for gestural control of applications which present information through the display; and various buttons and switches (collectively 422) on the exterior of the host device 410 which may include an on-off switch, along with various pushbuttons to control, for example, volume up/down. Another subsystem shown is audio subsystem 624 which includes D/A and A/D converters, buffers, signal processors, analog amplifiers, electrical connectors to interface to, for example, external headphones and microphones and the like. Internal audio transducers 426 shown, such as integral speakers and microphones, may be used to support recorded playback of audio media as well as is to support use of host device 410 as a telephone device or media recorder. Additionally, one or more cameras 428 may be included in the host device for capturing still images and video. A global positioning system (GPS) subsystem 430 may be incorporated by which the host device or applications hosted therein can determine the device's position relative to the Earth. Accelerometers 432 may also be included for determining attitude of the host device with respect to the Earth's gravity as well as to detect acceleration events.

This description of host device 410 is exemplary. Other host devices 410 may include other components in addition those described above, and may in some cases omit some of the components described above.

Turning now to auxiliary sensor system 450, it is seen that this auxiliary sensor system comprises its own sensor CPU 452, which may be housed or embedded within the wider bezel portion of lower housing 220 alongside connector 226 as was shown in FIG. 2B. Sensor CPU 452 may be, for example, a PIC™ microcontroller from Microchip Technology, Inc. having a small amount of internal nonvolatile flash memory for storing executable instructions. Sensor CPU 452 is shown to interface to a variety of optional components which may be used for sensing when a user's finger of the like comes into contact with the surface of device 100, especially in areas other than where the device's own touch-sensing layers are present.

One example of components that may be interfaced to sensor CPU 452 and used to determine contact are light-emitting elements 222a and 222b and light-receiving elements 224a and 224b. Under control of sensor CPU 452, light-emitting element 222a may emit light towards light sensing element 224a along an optical path 301 which preferably passes just above the surface of device 100. Sensor CPU 452 may also determine whether the light-receiving 224a element is receiving the light from light-emitting element 222a, which is an indication whether user contact is interrupting optical path 301. Emitter/receiver pair 222b and 224b may optionally be used to implement a second optical path 302 for determine user contact at a different place, such as area 311 described earlier. The light-receiving elements 224a, 224b may each be coupled directly or indirectly to an input of sensor CPU 452 so that the sensor CPU can ascertain whether each associated light path is open or blocked.

An alternative detection for user input is represented by an electrical switch 458. Switch 458 may be of a type that is a physically actuated by the user, such as a normally-open pushbutton switch disposed somewhere upon the surface of housing 200. This contact closure may be detected by having the switch complete an electrical circuit in such a way as to change the state of an input on sensor CPU 452. (For example, an I/O pin on the microcontroller may be designated for input and the input may be tied to circuit ground through a resistor (not shown). The switch may be connected between the positive supply voltage and the input pin. When the switch is open, the input pin remains at roughly a ground potential representing a logical '0' state. When the switch is closed, contact through the electrical switch pulls the input pin to a raised voltage or logical '1' state that is detectable by CPU 452.

A preferred technique for sensing user contact using optical paths between elements disposed in a housing is described in related co-pending U.S. patent application Ser. No. 13/837,715 which is hereby incorporated by reference herein.

Using a process executing within sensor CPU 452 as will be described below, sensor CPU 452 determines whether one or more light paths that are part of auxiliary sensor system 450 are interrupted in such a way that they represent intentional user input and communicates this information through a USB interface 460 between the auxiliary sensor system 450 and the host device 410. This USB interface is preferably the USB interface that is already supplied with, for example, the Apple iPhone through its connector 128. That is, auxiliary sensor system 450 comprises connector 226 that mates with connector 128 and accomplishes the USB connection between sensor CPU 452 and host CPU 412. The communications interface may take other forms, depending on the capabilities of the host device 410. For example, a near-field wireless link, such as a Bluetooth link, may also serve as a communications interface between sensor CPU 452 and host CPU 412. Likewise, other wired communications interfaces may also be used.

Additionally, power for auxiliary sensor system 450 may be obtained from the host device 410 and its battery 414 through the power supply and control interface 462. However, in an alternative implementation, auxiliary sensor system 450 may also serve as an auxiliary battery pack for supplying power to host device 410 and so FIG. 4 shows an optional auxiliary battery 470 being optionally coupled to the power supply and control interface 462 by which a battery disposed in housing 200 may serve to provide auxiliary power and prolong the usable 'on time' of host device 410.

Figure 5:
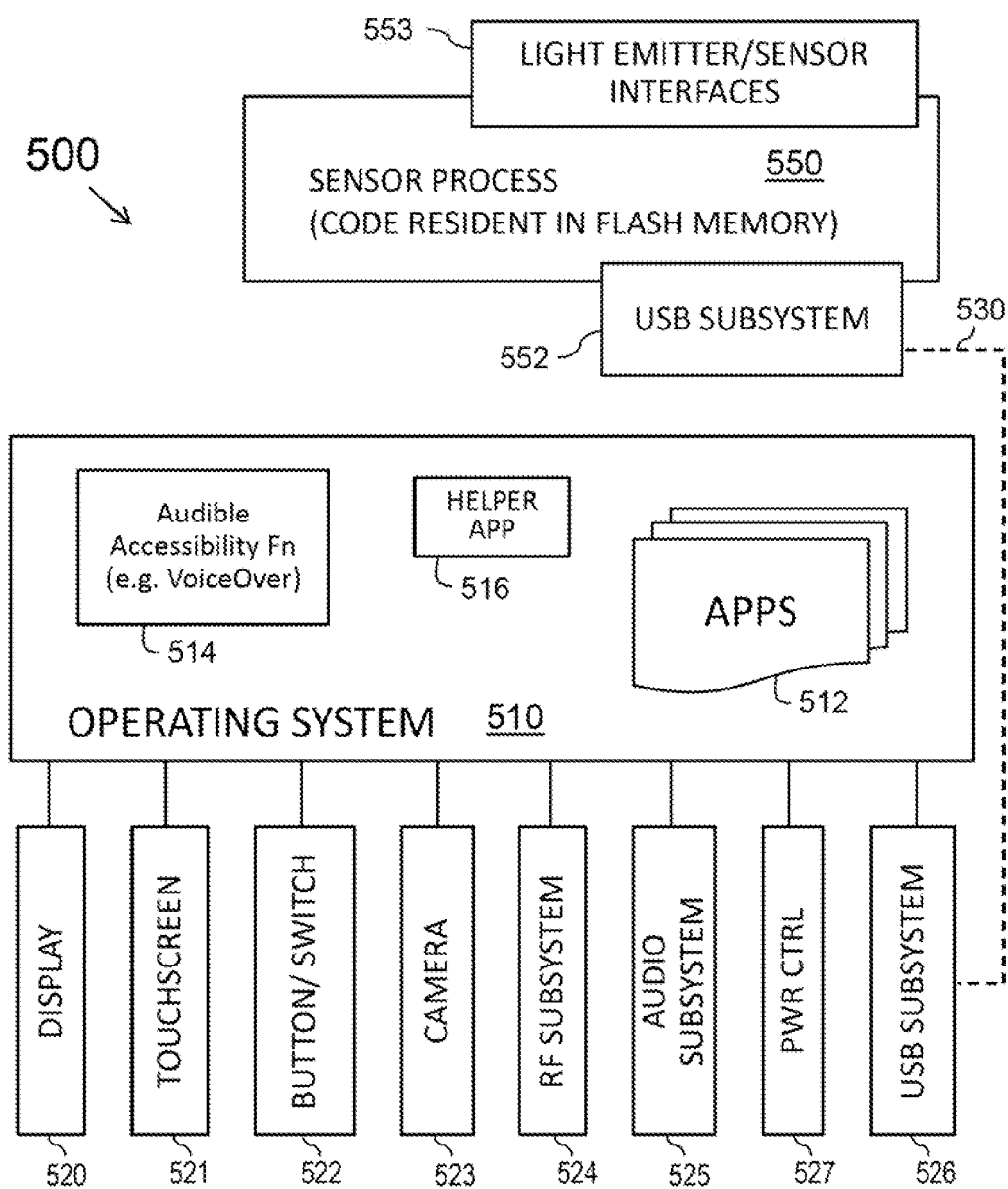
FIG. 5 is a block diagram of software functions and processes active within both a host device in an auxiliary sensor device in accordance with an exemplary embodiment that comports with principles described herein.

FIG. 5 provides a block diagram 500 depicting further system components that may be implemented, for example, as software instructions that are stored and configured to execute within the exemplary host device 410 and auxiliary sensor system 450 that were shown in FIG. 4. In the bottom portion of diagram 500, the host device is seen to execute an operating system 510 which in turn manages a number of applications 512. It further includes a number of interface subsystems 520-526 to interface with various hardware elements of the host device 410, such as the display, touchscreen, buttons/switches, etc., as further described below.

One application of particular note is the audible accessibility function 514, an example of which is the well-known accessibility feature called 'VoiceOver' used in the Apple iPhone. As will be described in detail later herein, this component is aimed at providing blind or low-vision users with audible readout describing elements that are on the display screen of the host device and allows users to locate and interact with some of these display elements.

In addition to the operating system 510 that supports the general functionality of the device and oversees the instantiation/execution of applications, the host device is seen to comprise a number of more specialized "lower level" subsystems which may be likened in general to device drivers in commonplace personal computers. These may also represent processes running in other processors or subsystems that communicate with and work cooperatively with the main host CPU. Where applicable, these blocks are also intended to represent low level "libraries" or APIs that may be invoked by applications to provide access to the capabilities of the hardware. These may be loaded and executed along with the operating system. These low level subsystems include: display interface subsystem 520, a touchscreen interface subsystem 521; a button/switch interface subsystem 522; a camera interface subsystem 523; an RF interface subsystem 524; an audio interface subsystem 525; a USB interface subsystem 526; and a power control interface subsystem 527.

In the top portion of FIG. 5, components are shown that may be implemented, for example, as software instructions that are stored and configured to be executed by, for example, the sensor CPU 452 introduced in FIG. 4. Sensor processing component 550 includes software that interacts with one or more of the sensory components of auxiliary sensor system 450, such as light-emitting elements 222 and light-receiving element(s) 224. This interaction may be facilitated through one or more interfaces 553. These interfaces may include current drivers for light emitters and bias/pre-amplification stages for light receivers. Interface(s) 553 may also include circuits that convert analog sensor input into distinct binary logic states suitable for input to a sensor CPU 452. Interfaces 553 may also refer to multi-sensor multiplexors or serial buses, such as an I2C bus, for communication between sensor CPU 452 and sensor components. Sensor processing component 550 further interacts with a USB interface subsystem 552 which provides for communication over a connection 530 with host system 410. As described further below, sensor processing component 550 interprets any notable events detected from the sensors and transmits signaling using the USB interface subsystem 552 over connection 530, to be available for use by host system 410, and in particular by an audible accessibility application 514 or other application 512 on host system 410.

Figure 6:
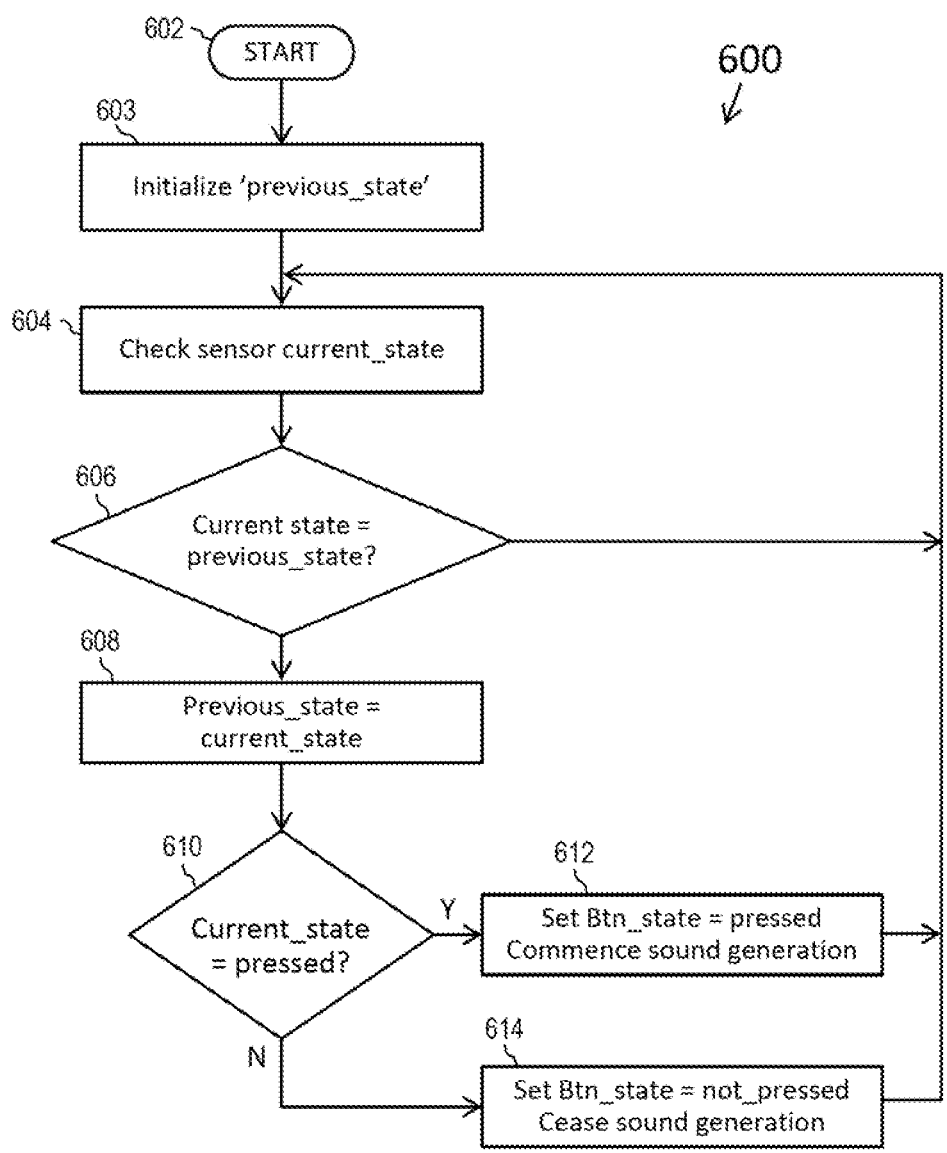
FIG. 6 is a flowchart describing an example process for evaluating the state of an auxiliary sensor in accordance with principles described herein.

FIG. 6 is a flowchart of a simple process by which a host device, working in collaboration with an auxiliary sensor device, may generically determine the state of an auxiliary sensor or button and apply this state to enriching functionality within the host device by providing additional modalities for user input concurrent with the typical use of the device through the touchscreen interface. Process 600 commences in step 602, which may correspond to any or all of the following events: initialization of the device through power on, initial startup of the operating system 510 or initial startup of particular applications 512, or activation of audible accessibility function 514. (FIG. 6 demonstrates usefulness and provides a general indication of how to employ the externally sensed input, but is not intended to be limiting in terms of the variety of practical implementations and applications.) Process 600 is the intermediary that records sensor state and then makes this information available to other applications in the context of operating system 510.

In process 600, a variable called 'previous_state' is initialized in step 603 and is subsequently used for detecting when a notable change of state for an external virtual button has occurred. Execution of process 600 then proceeds to step 604 wherein, in general, the state of an external button is determined by some technique such as by detecting interruption of a light path by a user's finger. The result of checking a button current state in step 604 is a Boolean result that is either a 'true' or 'false' (e.g. a logical '1' or '0'). Execution then proceeds to step 606 wherein a determination is made as to whether the current state extracted in step 604 represents a change in state compared to the last time the button state was checked. If, in step 606, it is determined that the current state is the same as it was during the previous check (current_state=previous_state), then execution simply resumes at state 604 (perhaps after some delay) to again check the state of the button.

Note that process 600 may be necessary if the external sensor circuitry according to the current teachings needs to interface an existing host device with minimal changes to the latter whereas, in an alternative situation where the host device may be designed to accommodate the external sensor, the external sensor might interface via I/O interrupts in order to have the host process the input.

If, in step 606, it is determined that the current state of the button is different than the immediately previous state, then a notable change in button state has occurred and execution proceeds to step 608 to update the previous_state to equal the current_state, as is important for detecting subsequent state changes. Execution then proceeds to step 610 wherein a determination is made as to whether the current state represents an affirmative pressing of the button by the user. If so, then execution proceeds to step 612 which, in this example process, commences the generation of a sound to indicate to a user that the auxiliary sensor is detecting user input and that, in accordance with the present description, an application, or an accessibility process 514, operating within the host device may interpret subsequent user input, such as through the touchscreen, in an alternative fashion compared to when the external sensor button is not pressed. A use for this functionality will be explained further below.

Returning to step 610, if it is determined that the current state of the button is 'not pressed', then execution proceeds to step 614 wherein the button state, which is likely represented by a software object within the operating system or an application, becomes reflected in a data value that indicates that the button is currently in a non-pressed situation. The discreet sound as described in step 612 would also cease upon reaching step 614. In accordance with one example way of using this auxiliary input, the sound could be generated to inform the user of the button state and the manner in which subsequent user input will be interpreted for long as the button is remains pressed. That sound would cease in conjunction with execution of step 614. Upon executing either step 612 or step 614, execution then returns to just before step 604 where the button current button state is again re-assessed. The duration for which process 600 continues to loop in this fashion may be based upon any one or more of the following situations: as long as power is applied to the host device 410, power is applied to the auxiliary sensor device 450, the operating system 510 is running, the audible accessibility function 514 is active, or any one of the applications 512 is executing.

Figure 7A:
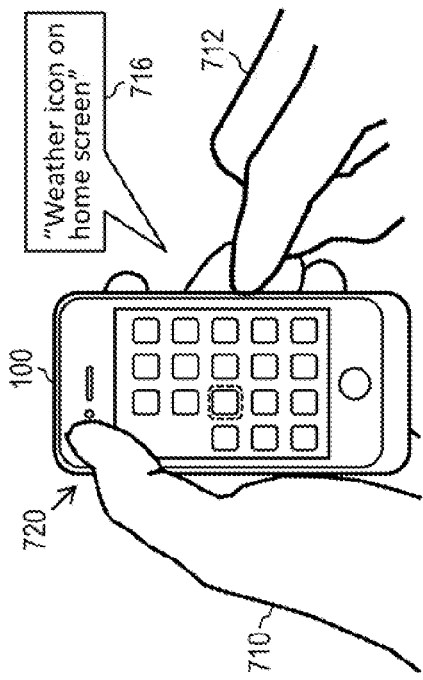
FIGS. 7A-7D are pictorial representations of a user grasping and interacting with a touchscreen computing device in accordance with an exemplary embodiment that comports with principles described herein.

FIGS. 7A-7D illustrate some examples of using a touchscreen computing device 100 in accordance with the present description. In FIG. 7A, a handheld touchscreen computing device 100 which is encased in an outer housing 200 is shown to be cradled in a user's left hand 710. The right-hand of the user 712 is shown to be interacting with the touchscreen on the mobile computing device and, in particular, making contact with the forefinger upon a displayed icon 705. Displayed icon 705 is also observed to the outlined by dotted line corresponding to the appearance of a typical VoiceOver cursor. In the example scenario in FIG. 7A, the act of the user pressing their finger upon the touchscreen where icon 705 is displayed elicits an audible response, such as an utterance of the word "Weather" 715, assuming that the VoiceOver audio accessibility mode is active.

Figure 7B:
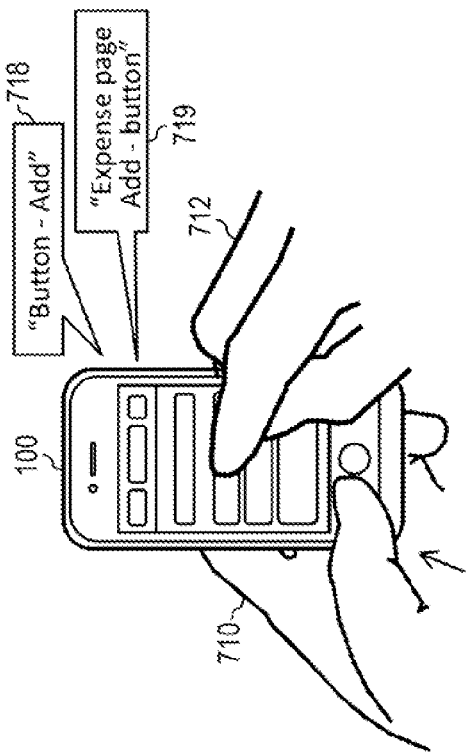

FIG. 7B pictorially illustrates a scenario that may occur following the action that was depicted in FIG. 7A. In FIG. 7B it can be seen that icon 705 remains highlighted as a result of the interaction that was shown in FIG. 7k However, the user's right-hand 712 is no longer in the vicinity of the touchscreen on the mobile device 100. Furthermore, the thumb of the user's left-hand 710 is observed to make contact with a non-touch sensitive portion of the touchscreen in the vicinity of the upper left corner of device 100 (see reference 720). Under these circumstances, as an example application of principles described herein, the presence of the user's thumb against the device at this particular location triggers a repeat of the previously spoken utterance 715 along with, optionally, some additional information as shown by the utterance 716 emanating from the device saying "weather icon on home screen". Thus, FIGS. 7A and 7B represent a "repeat that" functionality where in the device is prompted to put forth a readout without the user right-hand 712 having to again probe the touchscreen to determine where the current cursor location is or re-find icon 705.

Figure 7C:
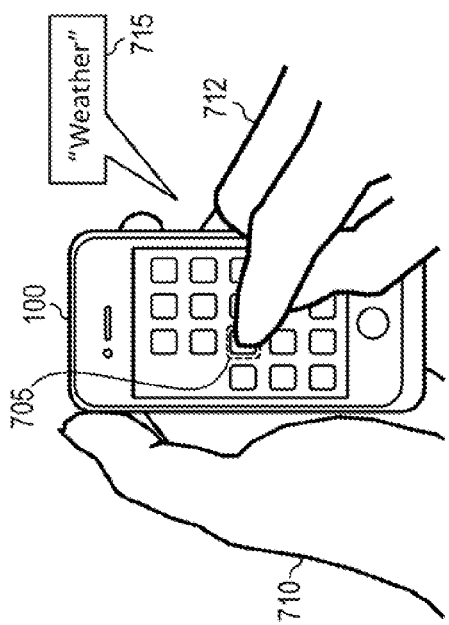
Figure 7D:
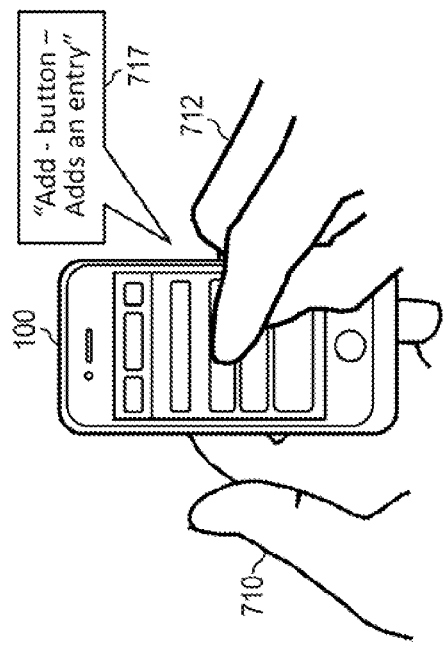

FIGS. 7C and 7D depict an alternative scenario where contact between the user's hand and a non-touch-sensitive portion of the surface of device 100 is used to affect the manner in which audible responses are presented to the user as they interact with the touchscreen or the device 100 in general. In FIG. 7C a user's left-hand 710 is shown to hold device 100 in such a way that the user's left thumb may freely access the left and lower portions of the touchscreen on the device 100. Meanwhile, the user's right-hand 712 is seen to be contacting the touchscreen and interacting with elements displayed thereon. In the particular example of FIG. 7C, the user's right forefinger has touched a button or other control for which the descriptive text is presented in an announcement 717 that says "Add . . . Button . . . Adds an entry".

As will be explained further below, the audio accessibility function, such as Apple's VoiceOver mode, retrieves descriptive information from user interface objects and presents information describing the name of the user interface element or the displayed text associated there with, followed by an indication of the type of element. In some cases when the user dwells upon the element long enough, an audible announcement will continue with a further description of the function that the element will perform if actuated.

In the existing scheme of announcing name and then type, the user must hear the entire announcement of the name of the control before hearing what type of control it is. Sometimes a user may instead find it useful to receive an audible indication of a type of user interface element before receiving further details as to the name of the object and so forth. If the audio accessibility function were to operate this way, at least sometimes, the user could quickly get a sense of the types of elements displayed on a page and perhaps therefore get an overall sense of the layout of the page before delving into the names of specific displayed elements.

In support of letting users momentarily alter or switch between different readout modes, FIG. 7D shows the use of the device 100 under the same circumstances as in FIG. 7C except that the user places their left thumb in contact with the device at what is normally a non-touch-sensitive region (see vicinity indicated by reference numeral 721) while acting upon the touchscreen. This point of contact corresponds to area 312 described earlier. This action causes device 100 to emit a different audible sound 718 in which the type of user interface element, namely a "button", is first announced followed by the specific name of the element.

An alternative utterance 718 is also depicted in FIG. 7D in accordance with another way in which the user's contact 721 could cause a different output compared to utterance 717. As indicated by utterance 719, the user's contact 721 may cause the audio accessibility function to review the hierarchy of user interface elements currently on the screen, to determine a higher level "parent" or "superview" of which the currently highlighted user interface element 730 is a 'child' or 'subview', to extract the descriptive information from the higher-level element, and to generate an utterance that includes an identification of the higher-level parent.

For example, the specific button 730, which is named simply "Add", is generic enough to appear in many divergent applications and even upon many displayed pages within a single application. It can be useful to an end-user to not only hear the name of the particular element but to also get a sense of the context, such as the name of the current overall page or application being displayed. In FIG. 7D such a response is represented by utterance 719, which in this example says "Expense page . . . Add . . . Button". This allows a user to quickly get a better sense of the context of the particular element with which they are interacting. This can be important when pages or views change but when the typical accessibility mode only describes a single control on the displayed page rather than prefacing the audible description with the more generalized new page context. This practice could also quickly disambiguate some similarly named elements that might appear so that the user does not have to re-explore a particular page, such as the heading of the page, to recall where they are conceptually in navigating the user interface. It is anticipated that device 100 may be used in a daily work and life environment wherein there may be many distractions and it is contemplated that any such features that help establish or reiterate context information will be generally helpful.

While FIGS. 7A-7D have depicted some particular scenarios wherein an external or auxiliary sensor may augment use of device 100, it should be appreciated that a wide variety of scenarios are possible, many of which will be further explored and explained in conjunction with FIGS. 12 through 20.

Figure 8:
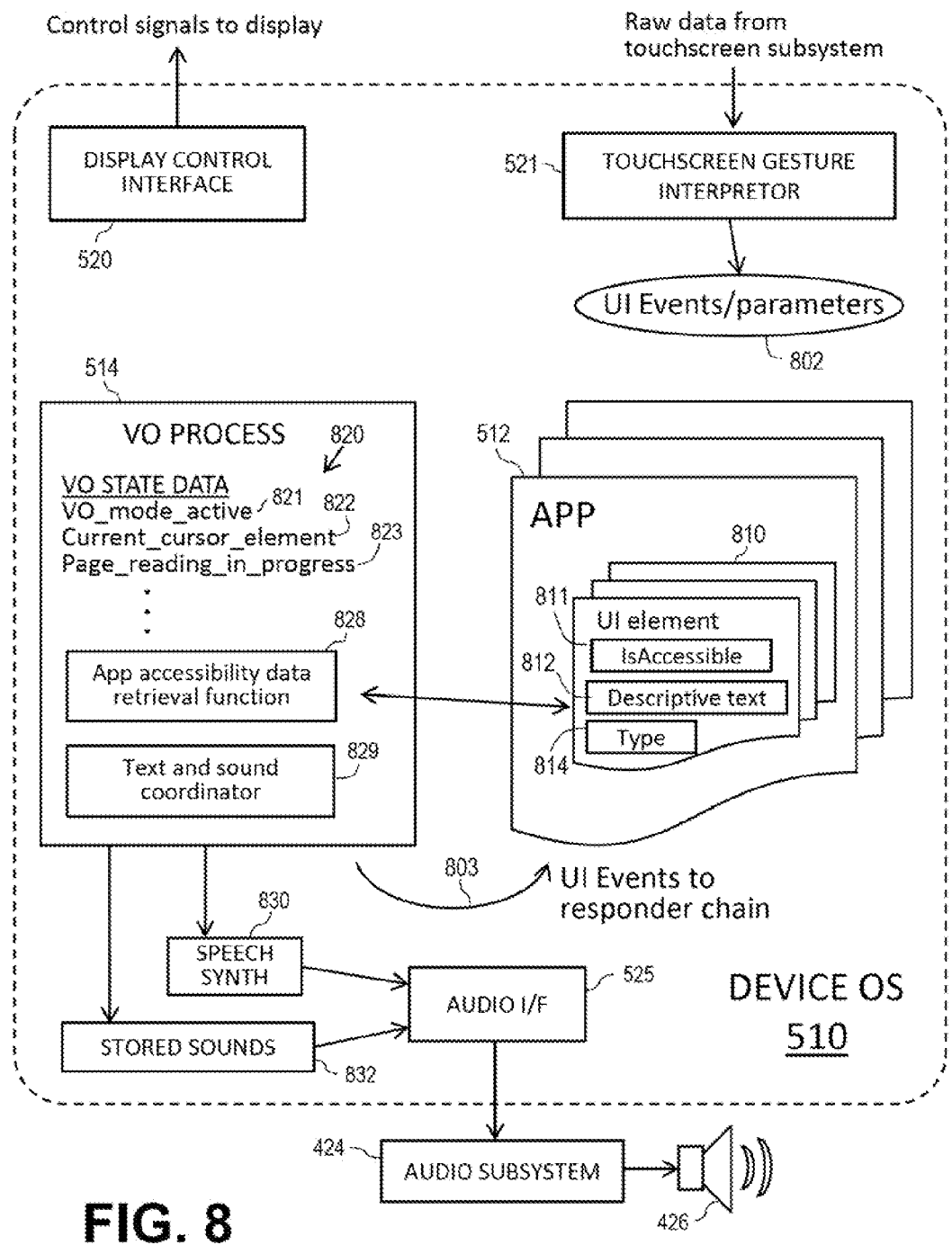
FIG. 8 illustrates the typical interaction among an audio accessibility process and applications hosted within an operating system of a touchscreen device.

FIG. 8 is a block diagram depicting the elements of a system to accomplish an audible accessibility interface for a mobile computing device 100 in general. While many of the elements depicted in FIG. 8 were introduced and described in conjunction with FIG. 5, FIG. 8 focuses upon certain specific elements involved in supporting an audible accessibility environment. In FIG. 8, device operating system 510 is seen to manage a number of applications 512, each of which typically has a corresponding plurality of user interface elements 810, that is, elements that appear on the display, involve interaction with the user, and correlate to user manipulation of data and activities within the application. Furthermore, within each user element 810, there is shown to be at least one descriptive text field 812 and one type descriptor for the element 814. The content of descriptive text field 812 is typically provided by a programmer who has developed the application and has provided coded instructions to implement the user interface elements therein.

For example, if the user interface for an application provides a button that, when pressed, will activate or open a calendar entry, then the programmer developing the application may include or associate with the user interface element some descriptive text that says "Opens a calendar entry". In this manner, when a user is navigating the user interface on the device with the audio accessibility feature or mode active, and the user encounters this button, they will hear an audible spoken utterance that says "Opens a calendar entry" followed by either another spoken utterance or a sound effect that indicates that the control functions like a button. Additionally, UI element 810 may include a data member 811 that simply indicates whether or not the element has accessibility information to offer.

FIG. 8 also shows an audio accessibility process, in this case VoiceOver process 514, which was introduced in FIG. 5 but is now shown in greater detail in FIG. 8. VoiceOver process 514 is shown to comprise a list of members 820 corresponding to state information relevant to the operation of the VoiceOver process. These include, but are not limited to, the 'VO_mode_active' state 821 used to indicate whether or not the audio accessibility mode is active currently active in the device. (It is possible for this state to be maintained elsewhere within the device operating system 510 rather than within the VoiceOver process itself and may be used to determine whether the VoiceOver process 514 is even loaded and instantiated.) Another member within members 820 may be a 'current_cursor_element' object which, by a pointer, handle, name or other identifier, uniquely specifies a particular user interface element, from among all of the user interface elements 810 belonging to all of the running applications 512, that is currently highlighted by and associated with the VoiceOver cursor. As explained earlier, the identity of the element that is currently highlighted by the VoiceOver cursor has significance for subsequent user input as well as providing navigational audible outputs to the user.

Another data element that may be included in VoiceOver state data 820 is a 'page_reading_in_progress' indicator 823, which serves to indicate whether or not the VoiceOver process is currently in a mode of continually extracting textual information from content that is currently displayed on the screen and streaming this information through a speech synthesis process 830 to read the contents of the screen to the user. As will be explained further below, there is a gesture that can cause the audio accessibility functionality in the device to begin continually reading all content for a given 'page' or view of information on the display and there is another gesture that can suspend or halt this continual reading. Page_reading_in_progress indicator 823 toggles to represent and/or control whether such reading is taking place.

VoiceOver process 514 is shown to comprise or work in conjunction with a data retrieval service 828 which serves to extract and assemble items of descriptive text 812 and user element type 814 from one or more user interface elements 810 that may be on the screen at any moment. Data retrieval service 828 may also check data as indicated in accessibility indicator 811 to control whether any such descriptive text 812 is subsequently retrieved and assembled for output to user.

VoiceOver process 514 is also shown to comprise or work in conjunction with a text and sound coordinator service 829. This service determines which items of descriptive text 812, as retrieved from using data retrieval function 821, are to be output to a user through the audio output. This service also controls the sequencing of textual output in coordination with any applicable sound effects. Text and sound coordinator service 829 can buffer textual output and pass this text string to a speech synthesis subsystem 830 so that the text can be rendered as playable audio data. Text and sound coordinator service 829 also controls the sequencing and timing between textual readout and sound effects. Commands to load and trigger the playback of sound effects may be coordinated from the text and sound coordinator 829, which passes identification of desired sound effects to a stored sounds repository 832. Sounds may be present in the form of encoded audio such as MP3 files permanently stored in the device or may be dynamically generated. The synthesized speech and/or applicable stored sounds to be played back are composited, or submitted in sequence, to an audio interface subsystem 525 which, in turn, passes audio data to audio subsystem hardware 424. The output from audio hardware 424 may be an analog signal that is then amplified and applied to a speaker 426 within device 100 (or to external transducers such as earphones) so that the end-user can hear the generated audio.

At the top of FIG. 8, it may be observed that raw data is received from touchscreen subsystem hardware and may undergo interpretation by a touchscreen gesture interpreter. A gesture interpreter may be implemented within the touchscreen subsystem 521 and outside of the scope of the device operating system, whereupon the operating system would receive user interface event notifications in which the nature of the gestures, such as the number of distinct contact points, duration, and substantial motion while in contact, have already been characterized. Either approach may be implemented while adhering to principles described herein. In any case, user input by way of making contact with the touchscreen is translated into one or more user interface events (with parameters) 802 which generally enter the operating system context of the device and are dispatched to or processed by user interface elements so that they can appropriately execute processes in response to the user input.

The manner in which user interface events are communicated to, or invoke methods upon, application elements involves, for example, hit-testing and responder chain processing to identify an appropriate event recipient within the hierarchy of control elements, as is well known in the art and so is only depicted in the most general sense here. It is worth noting, however, that when an audible accessibility mode is active, such user interface events 802 that are received from a touchscreen are generally first reviewed and processed by VoiceOver process 514 and evaluated before any such user input events or modified versions thereof, are then dispatched to user interface elements 810 (as depicted by passage of UI Events 803). It may be said that the VoiceOver process 514, while in operation, intercepts user input that would normally go directly to such user interface elements and therefore preempts the normal functionality that would occur when equivalent gestures are sent to the user interface elements.

Finally in FIG. 8, there is shown a display control interface subsystem 520 which may be used by the operating system or applications therein, to cause displayed information to change, such as superimposing a VoiceOver cursor upon an element displayed on the display.

FIGS. 9A-9D depict a process 900 for interpreting touchscreen gestures and presenting an audible accessibility interface. In this example flowchart, reference is made to Apple's VoiceOver as being an example of one such audible accessibility interface and the flowchart presented here roughly models the apparent operation of VoiceOver. However, process 900 is not intended to be an exhaustively accurate representation of how Apple's VoiceOver function actually works and need not be so in order to adequately portray useful embodiments according to principles described herein.

Process 900 commences in step 902 upon the receipt of a gesture-related event from a touchscreen on computing device 100. Important attributes for a gesture include number of separate contact points of contact that were recognized on the touchscreen, any motion associated with those points of contact, and the duration of such contacts. The gesture-related event is represented typically by one or more event messages or instantiated software objects describing the gesture sufficiently such that the important attributes are each included in the messages or can be ascertained by analysis. A gesture-interpreting function which may precede process 900 is assumed to have already interpreted raw sensor readings from the touchscreen surface and to have derived determinations as to number of points of contact and whether the duration of contact qualifies as a 'tap' gesture, a 'flick' gesture or a more prolonged sliding gesture.

In an environment supporting touchscreen devices such as Apple's iPad and iPhone products, and especially considering that the touchscreens are sensitive to a multiple simultaneous touches, the time-wise sequence of detecting one or more points of contacts and the movement of these contact points across the touchscreen may be reported in a very granular manner. In the case of Apple's iOS operating system and user interface frameworks, a single UIEvent object, instantiated when an initial touch is detected, may come to contain numerous UITouch objects as a gesture progresses. Each UITouch object describes a portion of the overall touchscreen gesture as it transpires. Applications may contain code that receives, parses and interprets this granular input to discern specific gestures such as taps and flicks. Alternatively, applications may call upon built-in gesture recognizers for analyzing the most common gestures.

Regardless of where such activity is performed, it is apparent that the raw moment-to-moment detection of touchscreen contacts must at some point be interpreted into categorized gestures that have corresponding actions (unless one is performing free-form sketching or handwriting.) For convenience in the present description, this process may be discussed in terms of user interface events or messages describing an interpreted gesture. It is acknowledged that the degree to which an event-representing object or message comprises raw touch data and the point at which such gesture interpretation actually occurs may differ according to implementation while still generally comporting with principles described herein.

In the case of the VoiceOver functionality provided in Apple devices, it is conceivable to interpret raw time-sequenced touch information within the VoiceOver software or to have some other function perform such interpretation and then pass more refined messages to the VoiceOver function. The choice between approaches is used is inconsequential to the present description and FIGS. 9A-9D may be granted latitude to encompass either such approach. Where the present description alludes to examining a gesture event message for a number of taps, for example, or discusses modifying a gesture message to alter numbers of contacts, it should be understood that a singular or composite software object or message that exists in whatever form can be acted upon correspondingly to achieve what is described herein. Furthermore, a particular characterization, often made for simplicity, as to what form of gesture-representing object or message may exist at any given point in the 'system' should not be construed to limit the range of useful embodiments to only circumstances where such characterization is indeed the case in currently existing products.

Returning to the discussion of process 900, upon the receipt of an interpreted gesture at step 902, execution proceeds to step 904 wherein a determination is made as to whether the audible accessibility mode is currently active on the device. The active state of the audio accessibility mode is typically established by the mobile device user in some form of settings menu or, as is well known for the iPhone, by a modal switch wherein the triple-click of the home button can toggle the VoiceOver functionality on and off. If it is determined in step 904 that the audio accessibility mode is not active, then processing proceeds to step 906 and the touchscreen gesture received or UI event received in step 902 is simply treated as normal and the UI event is passed to the usual hit-testing and responder chain processing. If the audio accessibility mode is not active, then the touchscreen input is interpreted as if the audio accessibility function were not even present. Thereafter, execution proceeds to step 908 and the handling of the touchscreen gesture received in step 902 by process 900 is concluded.

Returning now to step 904, if the audio accessibility mode is active, then execution proceeds to step 910 to analyze the number of distinct touches involved in the touchscreen gesture and to differentiate subsequent handling of the event on that basis. In the case that the number of distinct touch points equals one, then execution proceeds to step 912 to further differentiate processing of the event based on the number of taps, if any.

A tap gesture would be a short duration contact on the order of a quarter of a second or less and wherein the location of contact stays substantially constant. In contrast, a so-called 'flick gesture' corresponds to short duration along with significant lateral motion during the contact. A sliding gesture (often used for scrolling) corresponds to a long duration contact along with significant lateral motion.

A number of taps would correspond to a series of short duration contacts in quick succession, very similar to the cadence of performing a doubt click on a conventional computer mouse input device.

In step 912, if the number of distinct taps equals two, indicating that a double-tap, single-finger gesture has been made by the user, then execution proceeds to step 914, to send the equivalent of a single-tap gesture to whichever displayed control element is currently highlighted by the VoiceOver cursor. The VoiceOver cursor will generally have already been associated with an element by the action of other steps in process 900, such as steps 916, 918 and the remainder of steps shown in FIG. 9B. In this manner, the audio accessibility processing of process 900 will have effectively converted a double-tap gesture, while in an accessibility mode, into the same as a single-tap gesture. The latter will then be handled by an application in the usual manner. Once the single-tap has been dispatched to the application, process 900 concludes in step 908.

Returning to step 912, if it is determined that the number of taps equals zero, which may correspond to a more prolonged duration contact, then execution proceeds to step 916 to determine if the user interface event has been classified as a prolonged sliding gesture involving significant motion. If so, then execution proceeds to parts of the process 900 depicted in FIG. 9B as will be described shortly. If on the other hand it is determined in step 916 that the gesture is not a prolonged slide, then execution proceeds to step 918 to differentiate handling of the gesture event based on whether or not it corresponds to a flick gesture. If the gesture is a flick, either to the right or left, then execution of process 900 proceeds to step 920 to move the VoiceOver cursor to the next element in an established sequence or precedence to perform the text-to-speech announcement of each element as it becomes selected. (In some graphical user interface environments this sequencing is referred to as a 'tab order' because the keyboard 'tab' key is often used as a shortcut to move from element to element.)

Returning now to step 918, if it is determined that the gesture is other than a flick gesture, then execution proceeds to step 922 which refers to the possibility of other processing to further interpret the gesture or to perform other default processing, the specifics of which are not important for the current teachings and are excluded for the sake of brevity and clarity, and the process concludes in step 924.

Figure 9A:
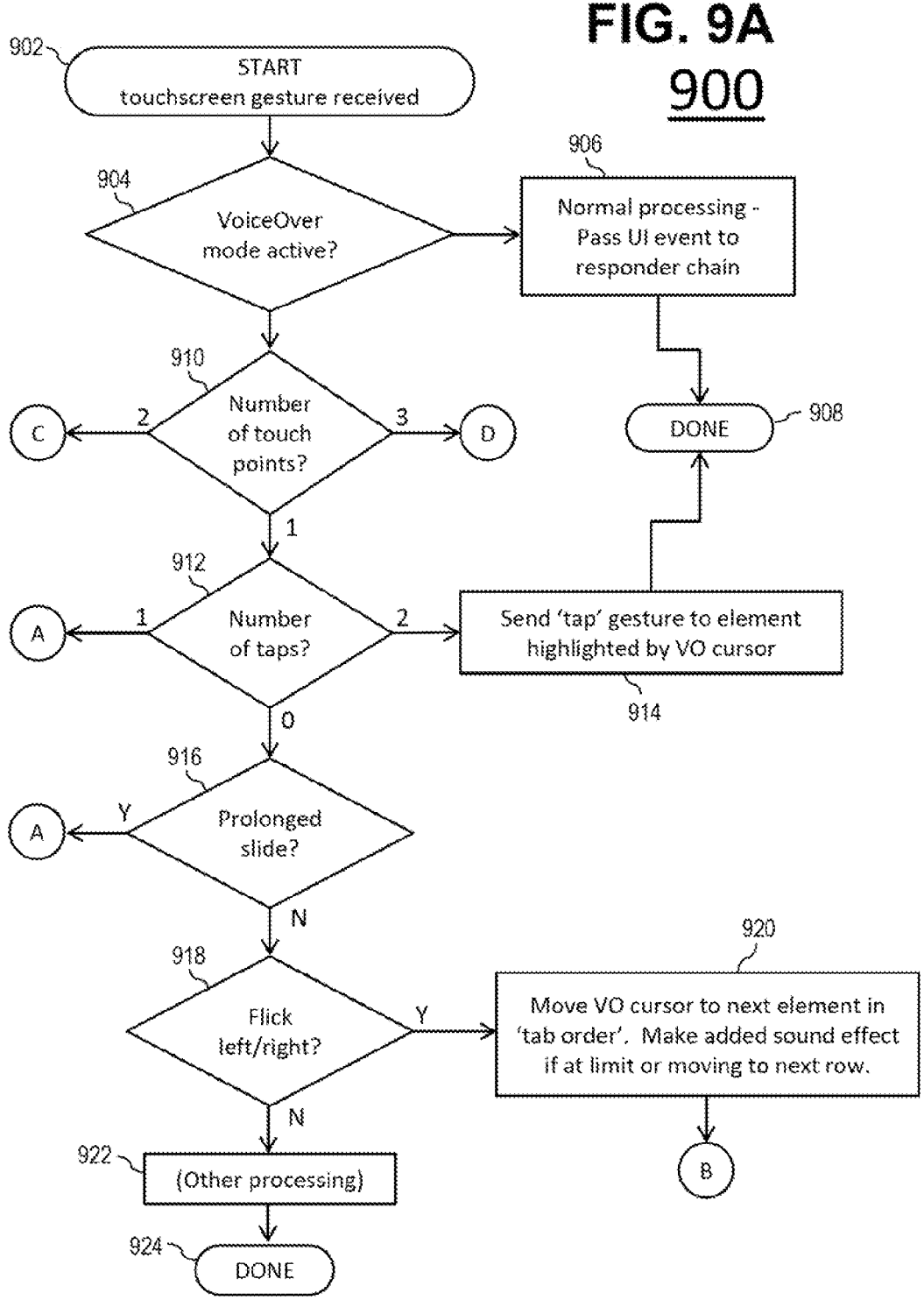

FIG. 9A depicts several branches in the process flow that lead to parts of process 900 that are depicted in other figures. For example, after the execution of step 920, then, as indicated by tag 'A', execution proceeds to step 930 as will be described for FIG. 9B. Tag 'A', which leads to step 930 in FIG. 9B, is followed by either, in step 912, determining the number of taps equal to one or, in step 916, determining that a prolonged slide gesture is being executed. Referring back to step 910, if the number of touch points is determined to be either two or three then, as indicated by tags 'C' and 'D', execution will proceed with either the process of FIG. 9C or 9D, respectively.

FIG. 9B is a continuation of process 900 picking up at step 930 which, as indicated above, may be arrived at from either step 912 or step 916 shown earlier. In step 930, a particular user interface element currently displayed under the touchscreen is correlated to the current touch position as determined from parameters of the touch screen gesture event received in step 902. In other words, the hierarchy of currently displayed control elements is analyzed to determine which element is indicated by the current touch position. This is the same type of 'hit-test' logic that is executed, for example, when a tap gesture is received to determine which element on the screen to which the tap should be directed.

Following this, execution proceeds to step 932 to compare the element at the current touch position, as determined in step 930, to the identity of an element, if any, that is currently highlighted by the VoiceOver cursor, perhaps as a result of a previous gestural interaction. If it is determined that the current gesture continues to highlight or indicate the same element has already been associated with the VoiceOver cursor, then no further action is taken to audibly identify the element because it presumably has already been announced at least once to the user of the device. Without step 932, a given element that is indicated by a user's touch gesture might continually try to be announced, leading to an undesirable cacophony. Instead, elements audibly announced only as a new particular element is becomes highlighted by motion of one's finger on the touchscreen.

Returning to step 932, if it is determined that a different element is now indicated by the point of contact compared to what was previously indicated by the VoiceOver cursor, then steps 934 through 938 are undertaken to audibly announce the newly indicated element and to make the VoiceOver cursor correspond to the newly indicated element. In step 934, any readout of text or generation sound effects already in progress pertaining to a previously indicated element is immediately halted. This allows information pertaining to the newly indicated element to preempt the complete reading out of the previously indicated element. This practice allows a user to move through a display with greater agility then if they had to listen to the entirety of each announcement, which could require several seconds, for each icon or control element before being able to move on to the next one. Instead, the user is able to hear just enough of the descriptive utterance to identify an element or icon before moving to the next one.

Next, in step 936, the newly indicated element (as based on current touch location) becomes the element associated with the VoiceOver cursor. Correspondingly, the view of the cursor on the display is updated to visually highlight the newly selected element.

Then, in step 938, the audible accessibility process obtains information from the object corresponding to the displayed control element, specifically retrieving data as to the control element type (button, text display, text entry, etc.) as well as descriptive text as is typically associated with the control element by whoever developed the application that is being presented. This information is assembled into a complement of text that is to be converted into speech signals along with a sound effect and/or spoken indication of control element type. In some cases there are two or more stages of descriptive information, with a first stage indicating the name of the control element and with a second stage providing more information on what effects will result in the application if the control element is actuated by the user. In some cases, the second stage of information may elaborate on the identity element.

Once the descriptive information for the element has been gathered in step 936, then execution proceeds to step 938 to render an audible signal based upon the textual information. As indicated in step 938, this may involve performing text-to-speech upon the descriptive text and adding sound effects (which may be prerecorded, dynamically generated or MIDI sound effects) to build a composite descriptive sound to be played out to the end-user. Step 938 also involves the step of buffering data representing sound, converting the data into an analog signal that is, in turn, transduced into an audible sound wave that is output to the user. Process 900 then concludes in step 939. It should be noted that process step 932 may also be directly entered from step 920 shown earlier. This corresponds to an automated incrementing from one element to the next without having to perform step 930 to map touch position coordinates to an element. In connection with step 920, the identity of each of the elements that are to be addressed in sequence is already known.

Figure 9C:
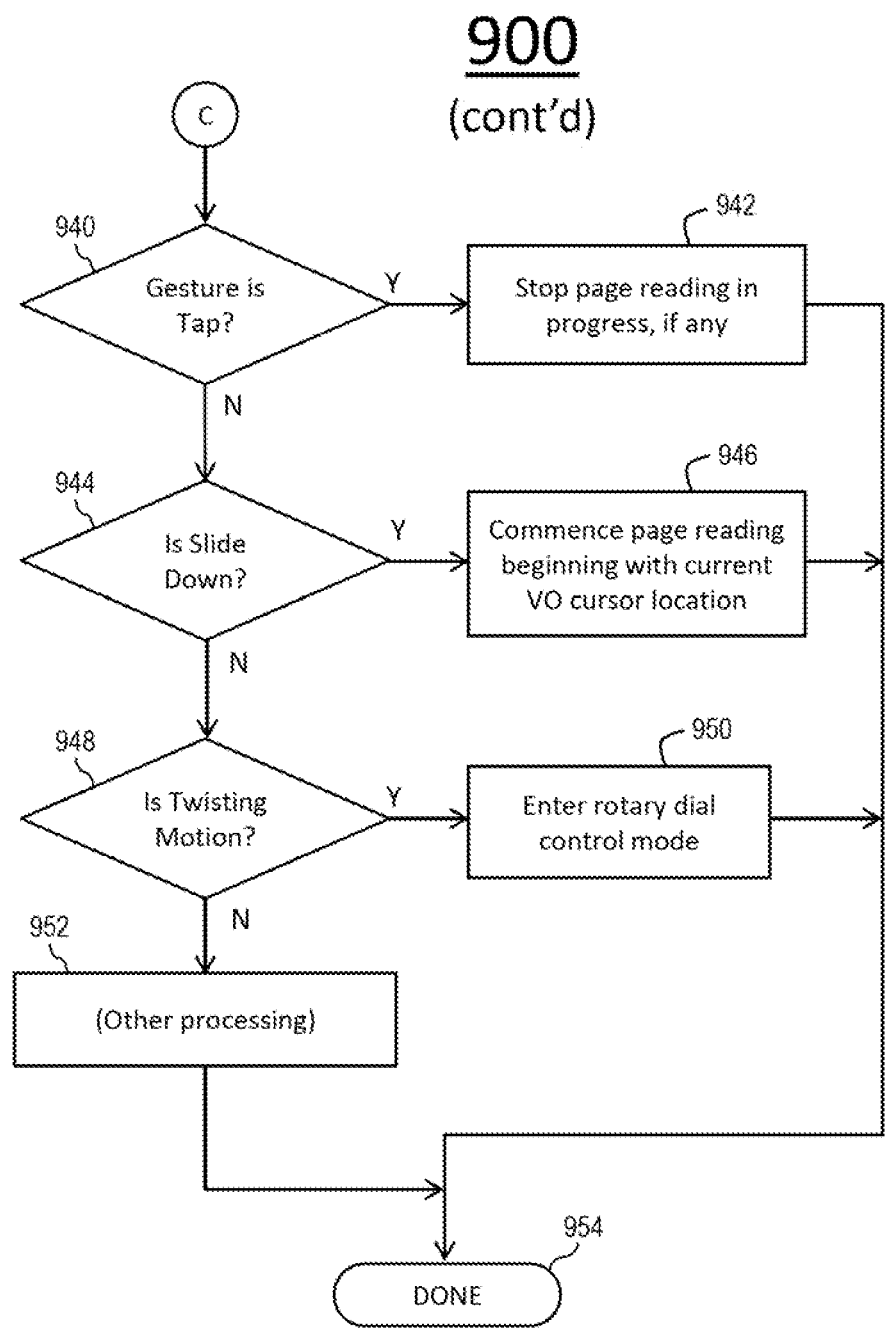

Turning now to FIG. 9C, process 900 continues in response to a determination in step 910 that the number of touch points involved in the touchscreen gesture equals two. That portion of process 900 shown in FIG. 9C corresponds to further interpreting the two-touch gesture in terms of its duration and any motion associated with the gesture. As mentioned above, the interpretation of the gesture in terms of whether its duration constitutes a tap or a more prolonged gesture, as well as whether any significant motion occurred while the user was in contact with the screen, may have already been declared upon receipt of the event in step 902. Alternatively, the process steps in FIG. 9C could be designed to perform that analysis upon more raw data conveyed in the event.

By way of background related to FIG. 9C, it is useful to explain that a user frequently desires to have the device simply read an entire page of content, such as an email message, using text-to-speech. This can involve reading several different displayed elements in sequence in their entireties from the top of the page to the bottom of the page (perhaps starting from a selected point such as indicated by the VoiceOver cursor). A two-finger swipe downward on a page initiates a process of sequentially reading everything that is on the screen using text-to-speech. To halt the reading process, the user customarily taps the screen using two fingers. Steps 940 through 946 are involved with implementing this functionality.

In step 940, it is determined whether the two-touch gesture is a tap gesture. If, so then execution proceeds to step 942 to halt any page reading that may be in progress. Processing of this gesture is then complete and process 900 concludes in step 954. Returning to step 940, if it is determined that the gesture is other than a tap gesture, then execution proceeds to step 944 to test the gesture as to whether it constitutes a downward sliding motion while two fingers were in contact with the screen. If so, then execution proceeds to step 946 to initiate page reading beginning with the current location of the VoiceOver cursor. Processing of the gesture having been completed, process 900 concludes in step 954.

If it is determined in step 944 that the gesture is other than a slide down, then execution proceeds to step 948 to determine if the two points of contact performed a substantially twisting motion during the contact. If so, then execution proceeds to step 952 enter a rotary dial control mode which is well known for devices like the iPhone but for simplicity will not be elaborated upon here. Processing of the gesture has been completed as far as process 900 is concerned and therefore process 900 concludes in step 954. Returning to step 948, if it is determined that the two-fingered gesture is other than a twisting motion, then execution proceeds to step 952 which refers to the potential for other processing or gesture determination as can be implemented but which is non-essential to the present description. After any such processing in step 948, process 900 concludes in step 954.

Figure 9D:
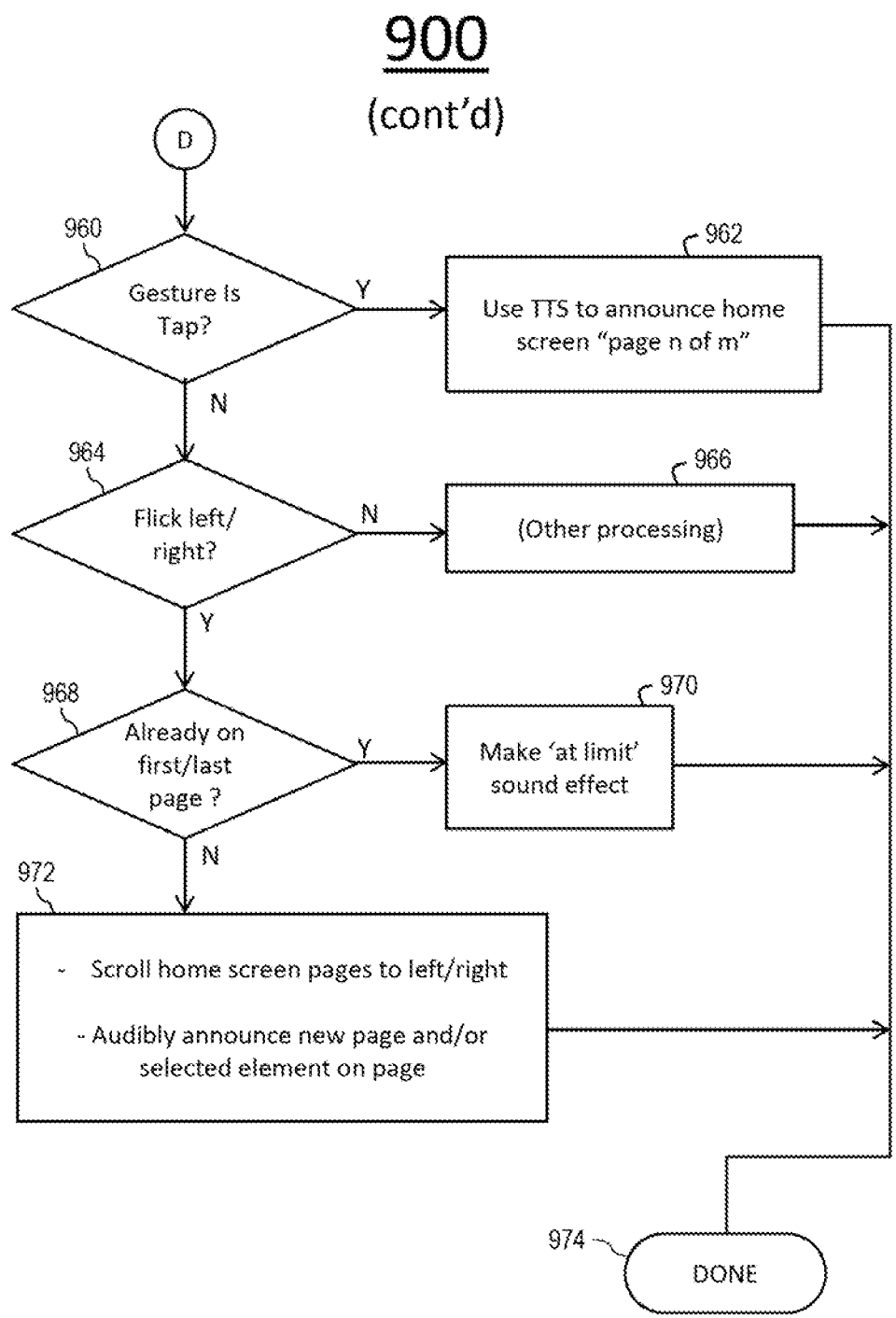

Turning now to FIG. 9D, the action of process 900 is further described, specifically in response to a determination made in step 910 wherein the number of touch points equals three. In general, the three-finger gestures addressed by FIG. 9D are intended to provide vision-impaired users with the ability to navigate through a scrollable, multi-page home screen as is familiar to users of Apple products such as the iPhone or the iPad. In general, a tap motion with three fingers elicits a description of the currently displayed page, specifically indicating which one of perhaps several displayable pages is currently being displayed. Furthermore, user input for achieving scrolling to adjacent home screen pages corresponds to a three-fingered flicking motion, that is, making contact with the screen using three fingers and then quickly drawing the three fingers across the screen either rightward or leftward to effectively slide the home screen sideways. Typically, whenever scrolling is requested and the home screen is already at an extreme leftmost or rightmost displayable page, a special sound effect is made to indicate to the user that they have in a sense 'bumped the limits'.

In support of these features, step 960 involves determining whether the three-fingered gesture is simply a three-fingered tap. If so, then execution proceeds to step 962 to use speech synthesis, also known as text-to-speech (TTS), to announce the home screen currently displayed as "page N of M", for example "page 2 of 3". Alternatively, if step 960 determines that the gesture is not a tap gesture, then execution proceeds to step 964 to determine if the gesture is a flicking motion.

If the gesture is a flicking motion, then the gesture corresponds to the user attempting to scroll home screen pages side-to-side, but the user may already be at an extreme leftmost or rightmost page. Therefore, step 968 is next undertaken to determine whether the user is already at a limit. If the user is trying to scroll rightward but the currently displayed home screen page is the rightmost page that can be displayed, then the user cannot scroll any further to the right. Step 968 refers to performing this test and, in step 970 generating an at limit sound effect to be audibly communicated to the user.

Otherwise if, in step 968, the user has not hit the limits of scrolling and it is possible to scroll to a next page either left or right, then, as indicated in step 972, the user interface on the device effectively scrolls the home screen pages as requested and, upon settling upon the scrolled-to home screen page, then audibly announces information about the page and/or a selected element on the page in the customary fashion. Returning to step 964, if it is determined that the three-finger gesture is not a flicking motion intended to scroll through pages, then execution proceeds to step 966 which refers generally to any other processing if any to further interpret the three finger gesture and initiate other corresponding actions as needed. In any case, following the execution of steps 962, 966, 970 or 972, the execution of process 900 concludes in step 974 and the gesture that was initially received in step 902 has been effectively handled.

Figure 10:
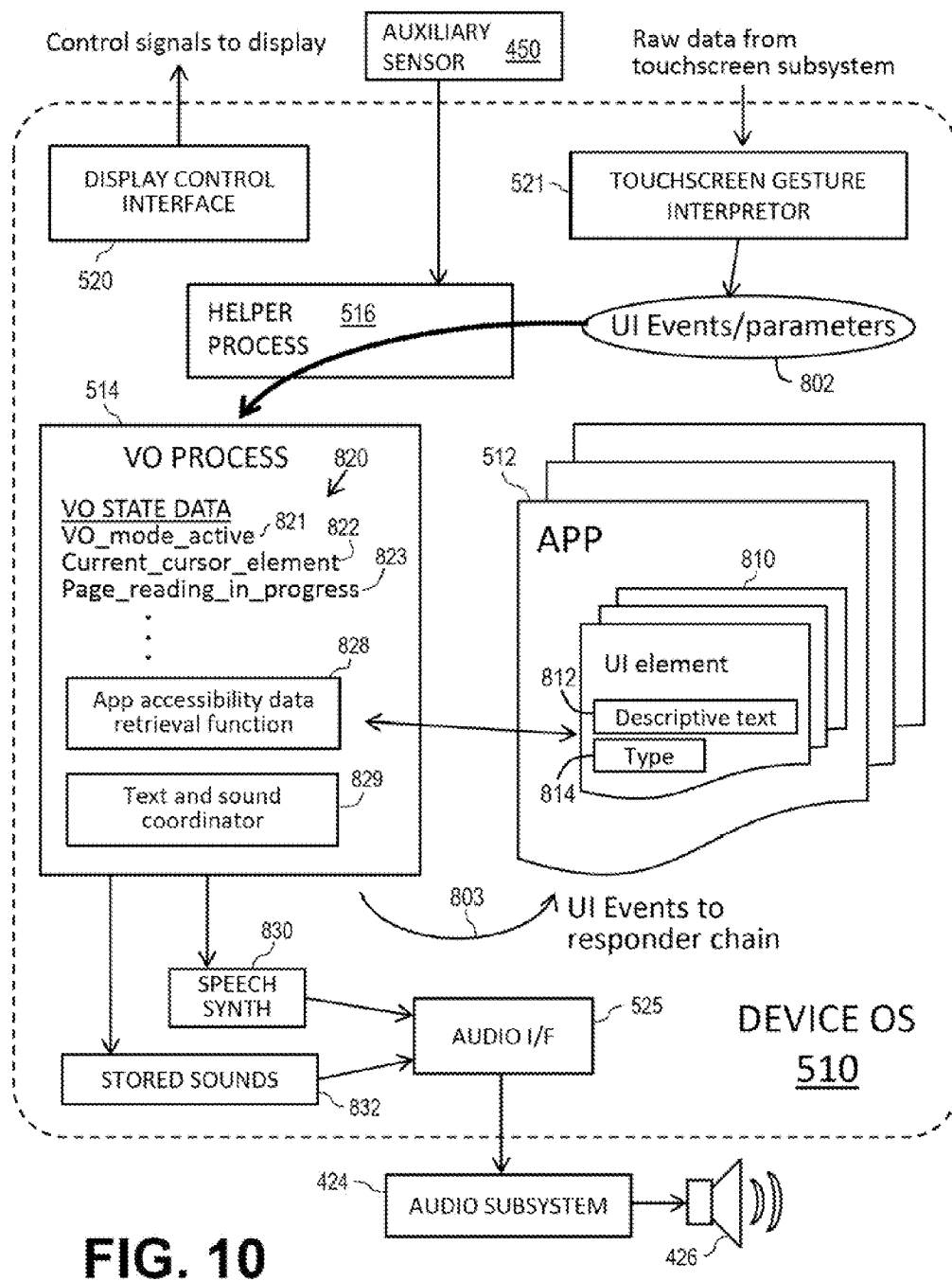
FIG. 10 illustrates interaction among a helper process, an audio accessibility process and one or more applications hosted within an operating system of a touchscreen computing device in accordance with an exemplary embodiment that comports with principles described herein.

Whereas FIG. 8 described earlier showed a general scheme in which an audio accessibility interface is operating within the context of an operating system in device 100, FIG. 10 depicts a similar implementation but augmented by additional capability made available through the use of auxiliary sensor system 450. In particular, FIG. 10 depicts an additional helper process 516 instantiated within operating system 510. Helper process 516 receives user interface events 802, preferably before these events are passed to VoiceOver process 514. Furthermore, helper process 516 is seen to couple to auxiliary sensor 450 such that user input through auxiliary sensor 450 may be taken to into account in the processing of user interface events 802 as will be described further below.

FIG. 10 represents an approach wherein helper process 516 overrides some of the functionality of VoiceOver process 514 by modifying the messages sent to the latter. FIG. 10 also comports with an approach wherein helper process 516 works collaboratively with VoiceOver process 514 but involves little to no change to the internal workings of the VoiceOver process 514, per se, and is therefore not 'tightly integrated'. Thus helper process 516 may be added to a device that is already employing VoiceOver process 514 or the like without requiring any changes to the device or to existing process 514.

Figure 11:
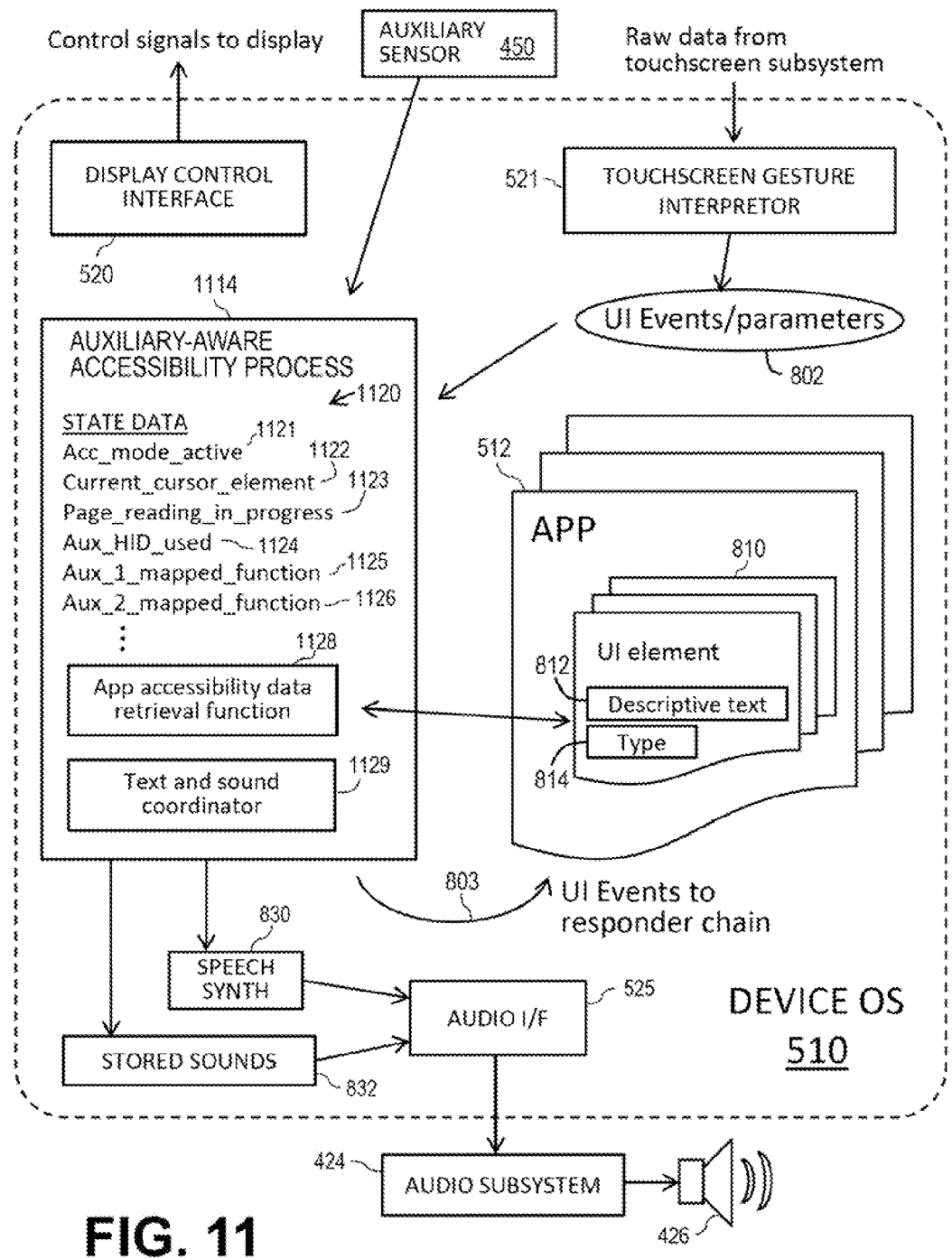
FIG. 11 illustrates interaction between an auxiliary sensor, an audio accessibility process and applications hosted within an operating system of the device in accordance an exemplary embodiment that comports with principles described herein.

Representing an alternative approach, FIG. 11 depicts a variation where in the audio accessibility interface previously represented by VoiceOver process 514 is replaced with what may generally be called an auxiliary-aware accessibility process 1114. Auxiliary-aware accessibility process 1114 may actually be implemented as a modified version of VoiceOver process 514 wherein some additional functionality, such as sensitivity to an auxiliary sensor 450, has been Integrated into the normal function of that process.

Access-aware accessibility process 1114 comprises a set of state data 1120 including an accessibility mode active indicator 1121, a current_cursor_element indicator 1122, a page_reading_in_progress indicator 1123, corresponding to similar data members that were evident in VoiceOver process 514 as shown in FIG. 10. Additionally, auxiliary-aware accessibility process 1114 further includes a data member called 'auxiliary_HID_used' 1124 to indicate whether an auxiliary sensor 450 is present so that input from that device can be taken into account in the handling of user input messages by process 1114. Further data members include one or more auxiliary_N_map_function fields 1125 and 1126 that relate to the ability of a user or programmer to arbitrarily configure an auxiliary sensor state to have a particular desired effect upon the interaction with the touchscreen or upon the style with which audible indications are presented to the user. These fields will hold settable values that indicate what effect a given auxiliary sensor is to have upon operation of accessibility-related processing. The use of these fields will be better understood in conjunction with the description that accompanies FIG. 20 below.

The various processes depicted in the figures which follow after FIG. 11 describe a variety of decision-making processes by which the input from an auxiliary sensor 450 may be taken into account in the processing of user interface events 802, either in a 'loosely coupled' implementation according to FIG. 10 or a more integrated implementation in accordance with FIG. 11. Some of these processes apply to actuating an auxiliary sensor simultaneously or in close succession with interactions upon the host device's touchscreen (as depicted in FIGS. 7A-7D) whereas others take action with only a single touch directly upon the auxiliary sensor. The user might may momentarily actuate an auxiliary sensor with the same pointing member, such as their right index finger, they normally use for touchscreen input.

Figure 12:
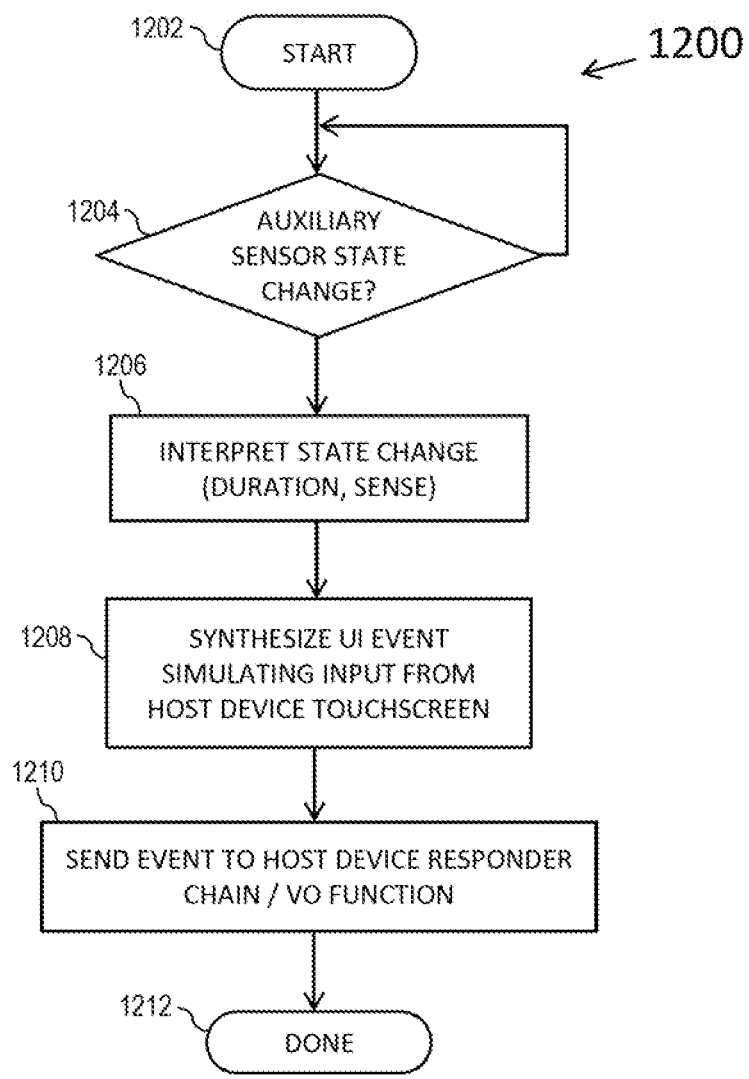
FIG. 12 depicts an example process, in accordance with principles described herein, by which an auxiliary sensor may initiate synthesized user interface events in accordance with an exemplary embodiment that comports with principles described herein.

FIG. 12 illustrates a general process 1200 by which input from an auxiliary sensor may be used to implement certain augmentative features by synthesizing a user interface event message that simulates input from the touchscreen of device 100 or other controls that are built into device 100. Specific applications of process 1200 are described later.

Process 1200 commences in step 1202 which may correspond to, for example, power up and initialization of device 100 or auxiliary sensor 450. Execution then proceeds to step 1204 where it is determined whether there has been a change in state for the auxiliary sensor, that is, whether the user of device 100 has just now pressed or released a 'virtual button' implemented by auxiliary sensor 450. If there has been no change in auxiliary sensor state, then process 1200 simply loops back to continue to check for any such change.

A variety of techniques may be utilized for periodically checking the auxiliary sensor on a polling basis, as triggered by system timers, on an interrupt-driven basis, etc. Any of these approaches may be selected as a matter of design choice while still comporting with principles described herein. If, in step 1204, it is determined that the auxiliary sensor state has changed, then step 1206 is performed to interpret the state change, for example, in terms of the duration and sense of the state change, to drive a description of the gesture, such whether it is merely a momentary tap or the 'virtual button' is being held down.

Next, in step 1208, a user interface event is synthesized representing the auxiliary sensor originated gesture, which may simulate a gesture that could normally be received via the host device touchscreen. Then, in step 1210, the synthesized UI event is dispatched to the host device, specifically to the point at which such events normally enter for hit-testing and responder chain processing. It should also be noted that, when the VoiceOver audio accessibility mode is active, then user interface events, including ones synthesized by the process 1200, will generally be passed to the accessibility function first where they may trigger audible responses. These may also be modified or converted into alternative user interface events before being passed to the user applications and responder chain.

As part of helper process 516, process 1200 may be particularly useful in the context of an implementation in which it is desirable to minimize changes to or integration with VoiceOver process 514. After the user interface event has been dispatched to the host device in step 1210, process 1200 concludes its handling of the sensor state change in step 1212.

Figure 13:
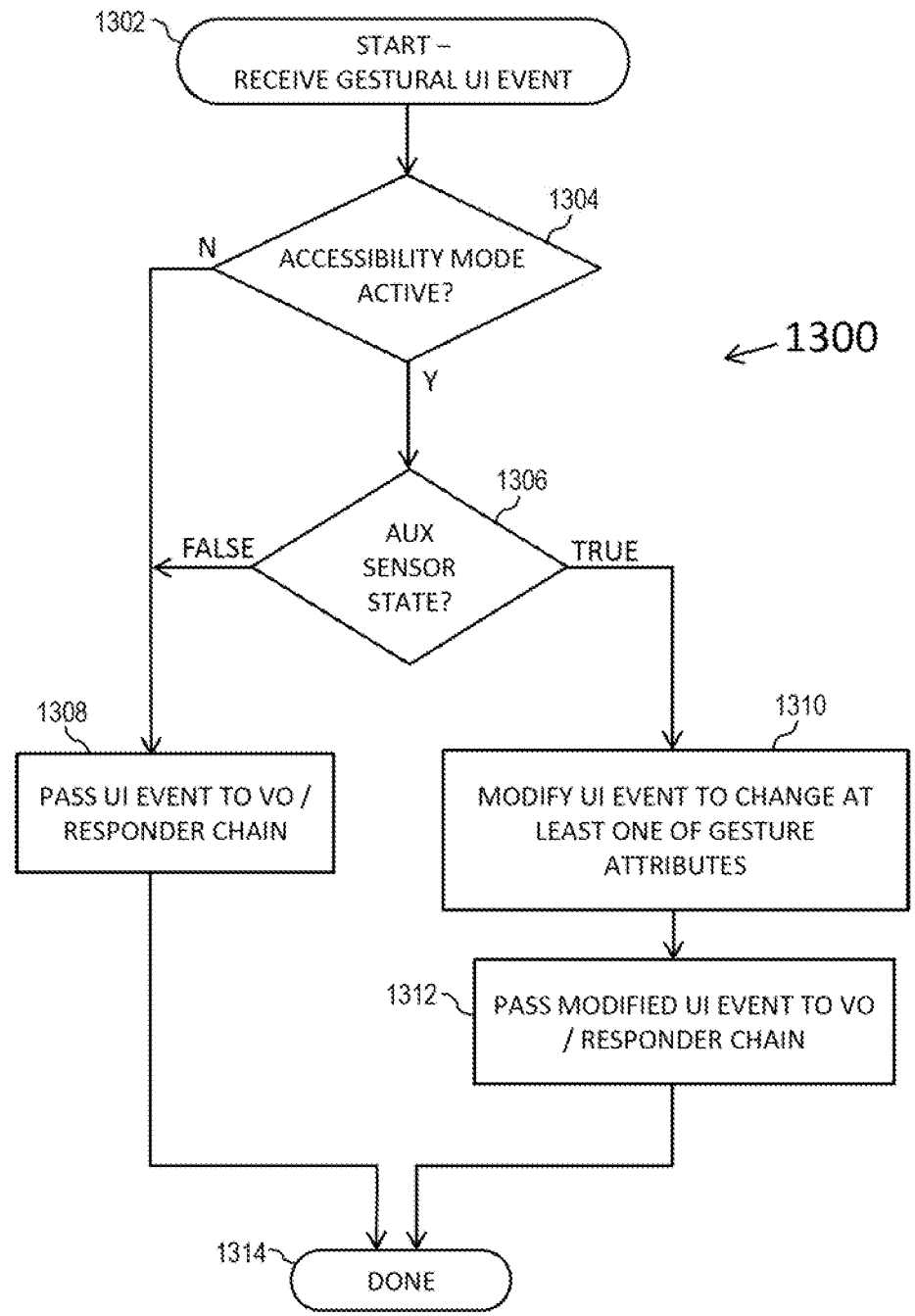
FIG. 13 depicts an example process, in accordance with principles described herein, by which activation of an auxiliary sensor may cause modification of user interface events from a touchscreen in accordance with an example embodiment that comports with principles described herein.

FIG. 13 depicts a process 1300 which, similarly to process 1200, works primarily in the context of a helper process 516 that augments VoiceOver process 514 without requiring changes to the latter. However, process 1300 differs from process 1200 in that process 1300 acts to modify or convert user interface events that are received from the normal touchscreen. In essence, process 1300 changes certain gestures into other gestures, which can be advantageous in some situations as will be demonstrated. Process 1300 commences in step 1302 upon the receipt of a user interface event representing a gesture from a touchscreen. This may correspond to the receipt of touchscreen input by a gesture interpreter 521 and the output of user interface events with parameters 802 as depicted in FIG. 10 and elsewhere.

Once the user interface event is received in step 1302, execution proceeds to step 1304 wherein further processing is differentiated based upon whether the audio accessibility mode in device 100 is currently active. (One way to check this in the context of Apple's iOS is made available to developers in a function called "UIAccessibilityIsVoiceOverRunning( )".) If it is determined in step 1304 that the accessibility mode is currently not active then execution proceeds to step 1308 wherein the user interface event is simply passed transparently to the VoiceOver function and then presumably to the remainder of the responder chain process by which the application user interface elements will process the user input, although it has already been noted that the VoiceOver function has the ability to alter or handle user interface events without necessarily passing them on to applications. Once the user interface event has been passed along as in step 1308, then the execution of process 1300 concludes in step 1314.

Returning to step 1304, if it is determined that the accessibility mode is active then execution proceeds to step 1306 to determine the current state of the auxiliary sensor. (The 'true' or 'false' sense of the auxiliary sensor is entirely arbitrary according to design choice and may be processed in exactly the reverse as what is shown here without contradicting the basic operating principles of the present description.) If step 1306 finds that the sensor state is 'false', then execution simply proceeds to step 1308 to leave the user interface event received in step 1302 unaffected and to pass the user interface along to the VoiceOver function, etc.

Otherwise if, in step 1306, the auxiliary sensor state is 'true', then execution proceeds to step to alter the user interface event so that it will be interpreted differently by downstream processing such as within VoiceOver function 514 and perhaps user interface elements or other functionality within applications 512. For example, a single-touch gesture might be converted to a double-touch gesture under some circumstances, causing the device to respond differently. As another example, a short duration gesture that corresponds to a tap gesture may be converted into a double-tap gesture, again affecting how device 100 responds to the touchscreen input. Thus, the auxiliary sensor input may be used to modulate the manner in which device 100 interprets input received concurrently through its normal touchscreen.

After the user interface event has been modified in some fashion in step 1310, then the modified user interface event is passed along in step 1312 such that the VoiceOver process or subsequent elements in the responder chain can process the modified event which will mimic a different gesture than the actual input from the touchscreen. Processing of the user interface event than concludes in step 1314.

Figure 14:
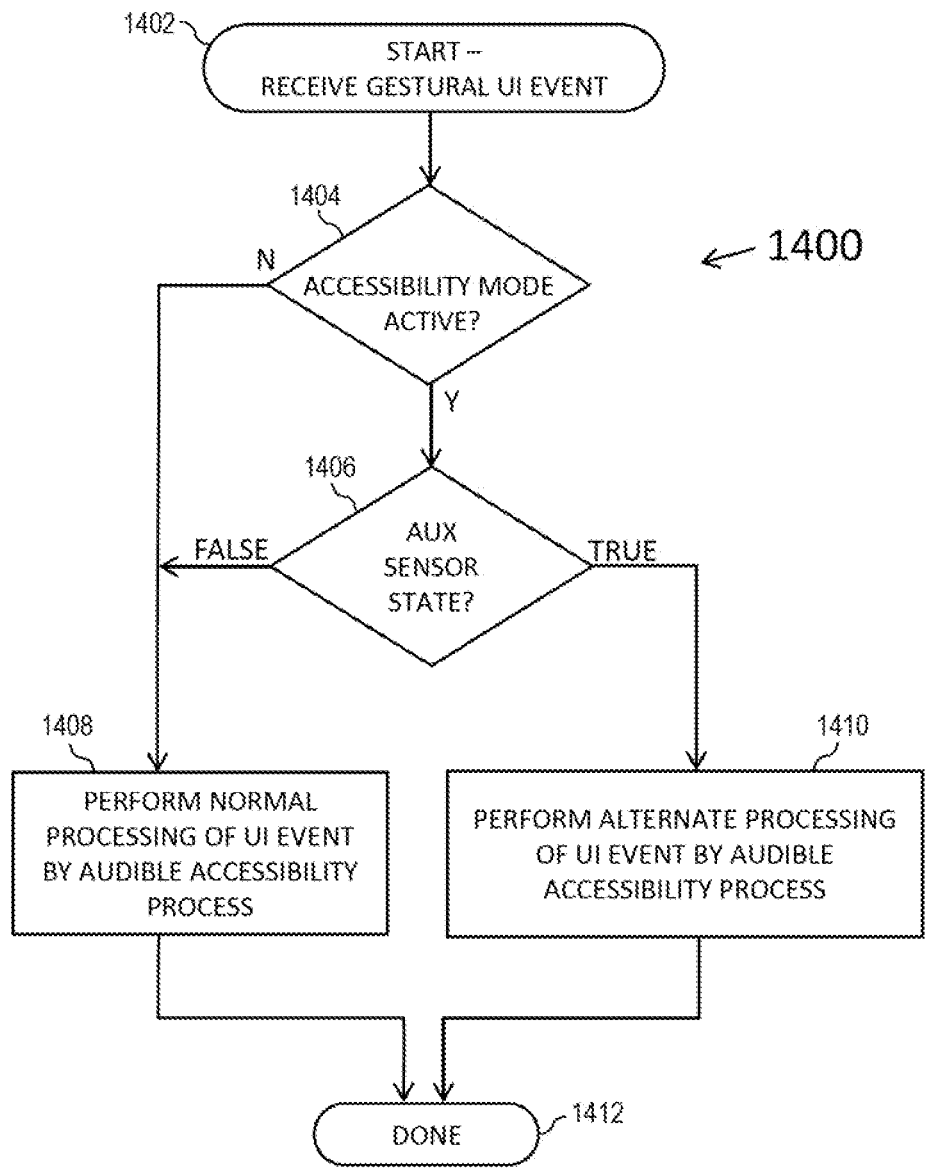
FIG. 14 depicts an example process, in accordance with principles described herein, by which activation of an auxiliary sensor may change the manner in which an audible accessibility process acts in response to user interface events from a touchscreen in accordance with an exemplary embodiment that comports with principles described herein.

FIG. 14 is a flowchart illustrating a process 1400 for altering the manner in which an audible accessibility process handles a given touchscreen gesture based upon input from an auxiliary sensor. Unlike processes 1200 and 1300, process 1400 assumes modifications to, or integration with, the audible accessibility process to incorporate auxiliary sensor input. Process 1400 is suited to implementation in the context of auxiliary-aware accessibility process 1114 as was introduced in FIG. 11. Specific applications of process 1400 are presented in later figures. In general, the manner in which user interface events are processed by the audible accessibility process are varied by dynamically altering the operation of the data retrieval function 1128, the text and sound coordinator 129 and perhaps other processing functions.

Process 1400 commences in step 1402 upon the receipt of a gestural user interface event. Upon receipt of the user interface event in step 1402, execution proceeds to step 1404 to determine whether or not the accessibility mode is active. If not, then execution proceeds to step 1408 to perform normal processing of the user interface event by the remainder of the audio audible accessibility process 1114, or the like, and the process 1400 concludes in step 1412. Alternatively, if in step 1404 it is determined that the accessibility mode is active then execution proceeds to step 1406 to determine the sense of the auxiliary sensor state, it being noted that the absolute sense in which the auxiliary sensor is interpreted may arbitrarily be reversed according to design choice.

Assuming that the auxiliary sensor state of 'false' defaults to normal processing of user interface events then execution proceeds to step 1408 as described earlier. Otherwise if it is determined in step 1406 that the sensor state is 'true', then execution proceeds to step 1410 to perform an alternative processing of the user interface event by the audible accessibility process and to then conclude process 1400 in step 1412. In other words, some aspect of the processing that occurs within the auxiliary-aware accessibility process 1114 is differentiated based upon the state of the auxiliary sensor. Auxiliary-aware accessibly process 1114 operates fundamentally the same as process 900 except that, at certain junctures in the processing, variations are introduced in view of the auxiliary sensor input. Specific examples, as well as points in process 900 where differentiation may occur, in accordance with the present description are further described in connection with FIG. 20 discussed below.

Figure 15:
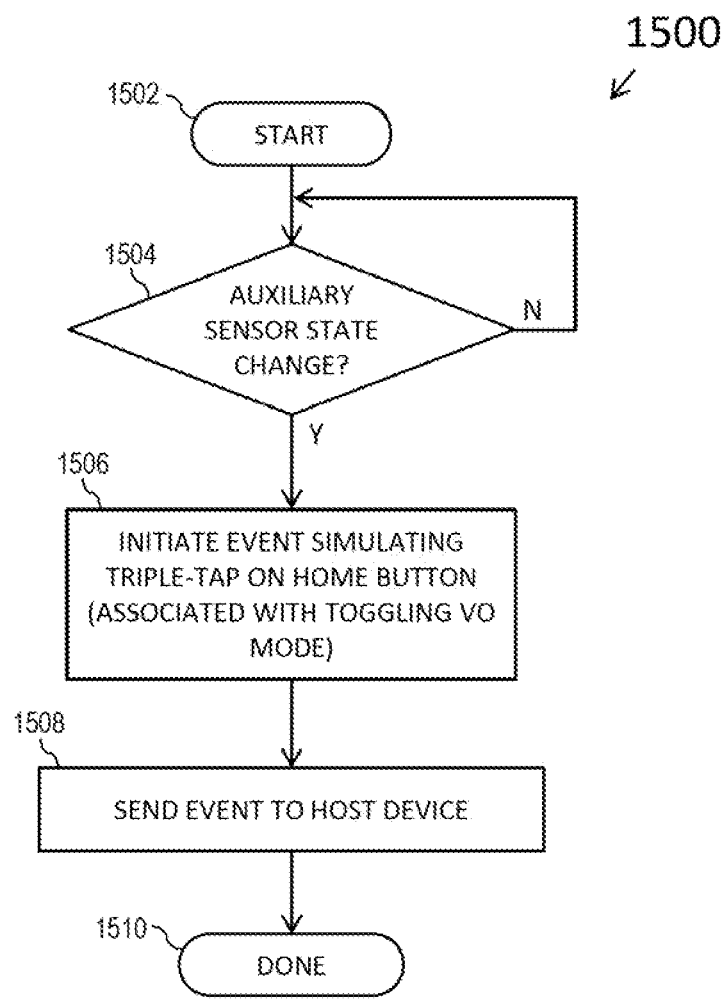
FIG. 15 depicts an example process, in accordance with principles described herein, by which actuation of an auxiliary sensor may toggle the active state of an audio accessibility process within a host device.

FIG. 15 is a flowchart of a process 1500 comparable to generalized process 1200 for synthesizing user interface events but with added specifics to implement a particular feature in which the VoiceOver mode may be toggled on and off merely by the user actuating one or more auxiliary sensors. Process 1500 commences in step 1502 which may correspond to power up of either the device 100 or the auxiliary sensor 450, or the activation of an auxiliary sensor mode, or the like. Once process 1500 has commenced then execution proceeds to step 1504 to determine when the auxiliary sensor state changes and to proceed to other steps 1506, 1508 only when the sensor state has changed.

When the sensor state changes, then execution will proceed to step 1506 to initiate a user interface event simulating the same input that occurs when there is a triple-tap on the home button of the device which, as is well known on the Apple iPhone, may be associated with toggling the VoiceOver function on and off. In step 1508, this synthesized event is passed to the host device, so that it will be processed in the same manner as a triple-tap gesture and then the process 1500 concludes in step 1510. Although this particular feature is somewhat duplicative of the relevant typically simple act of triple-tapping on the home button device, this capability is indicative of other possible uses for creating synthesized user interface events. This capability also allows a user to devote the triple-tap on the home button for other purposes, that is, to associate it with other actions so that the general usefulness of the device's inherent interfaces are multiplied by use of the presently described auxiliary input sensors.

Figure 16:
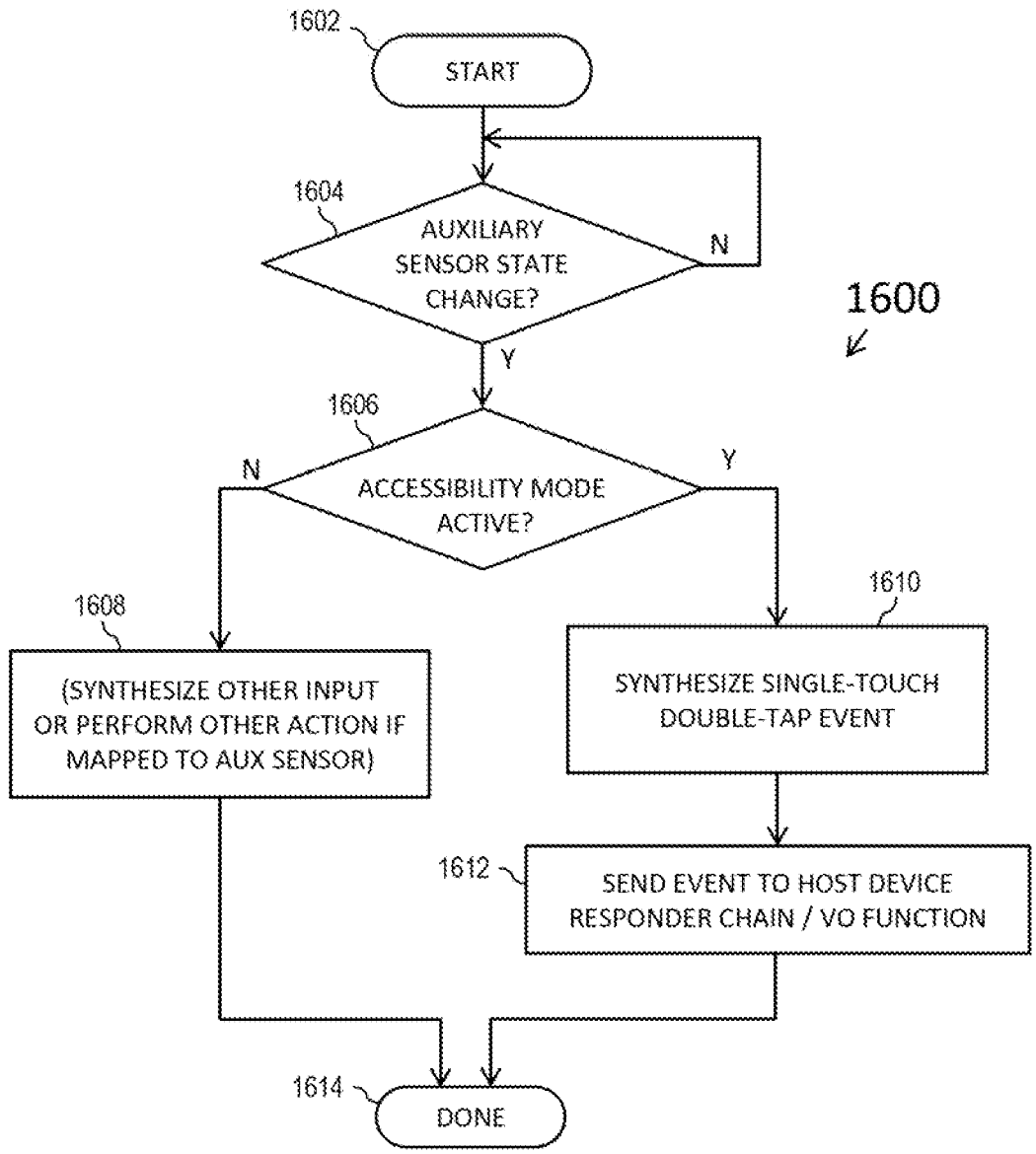
FIG. 16 depicts an example process by which actuation of an auxiliary sensor may trigger actuation of a displayed user interface element when an audio accessibility process mode is active.

FIG. 16 illustrates the steps in a process 1600 as a specific variation upon process 1200 involving synthesis of user interface events. Process 1600 commences in step 1602 which is comparable to step 1502. Step 1604 is then performed to assess if and when the auxiliary sensor state changes, effectively looping back until such change is detected. When such change occurs (and subject to the polarity of such change) execution proceeds to step 1606 to determine whether the accessibility mode is currently active. If not, then execution proceeds to steps 1608 and 1614 to perform any actions appropriate for the noted change of state of the auxiliary button. These actions may be configured by user settings. General users of the device may advantageously employ the auxiliary sensor for providing 'hot key' functions or other expanded operations or features aside from in the context of enhancing accessibility. Users may wish to arbitrarily map one or more auxiliary sensors to particular functionality, such as simulating other inputs that would normally be made through the touchscreen.

Returning to step 1606, if it is determined that the accessibility mode is active, then execution proceeds to step 1610 to, for example, synthesize a single-touch double-tap event and, in step 1612, to send the synthesized event to the host device so that it will be processed by the VoiceOver function 514 or the like. In the context of using VoiceOver as was described at step 914 in FIG. 9A, the passage of a single touch double-tap gesture to VoiceOver causes a single-tap gesture to be sent to the element currently highlighted by the VoiceOver cursor. Essentially, process 1600 represents an adaptation of process 1200 which results in an auxiliary sensory input to act as a "do that" button for use in conjunction with VoiceOver functionality. After dispatching the event in step 1612, process 1600 concludes in step 1614.

Figure 17:
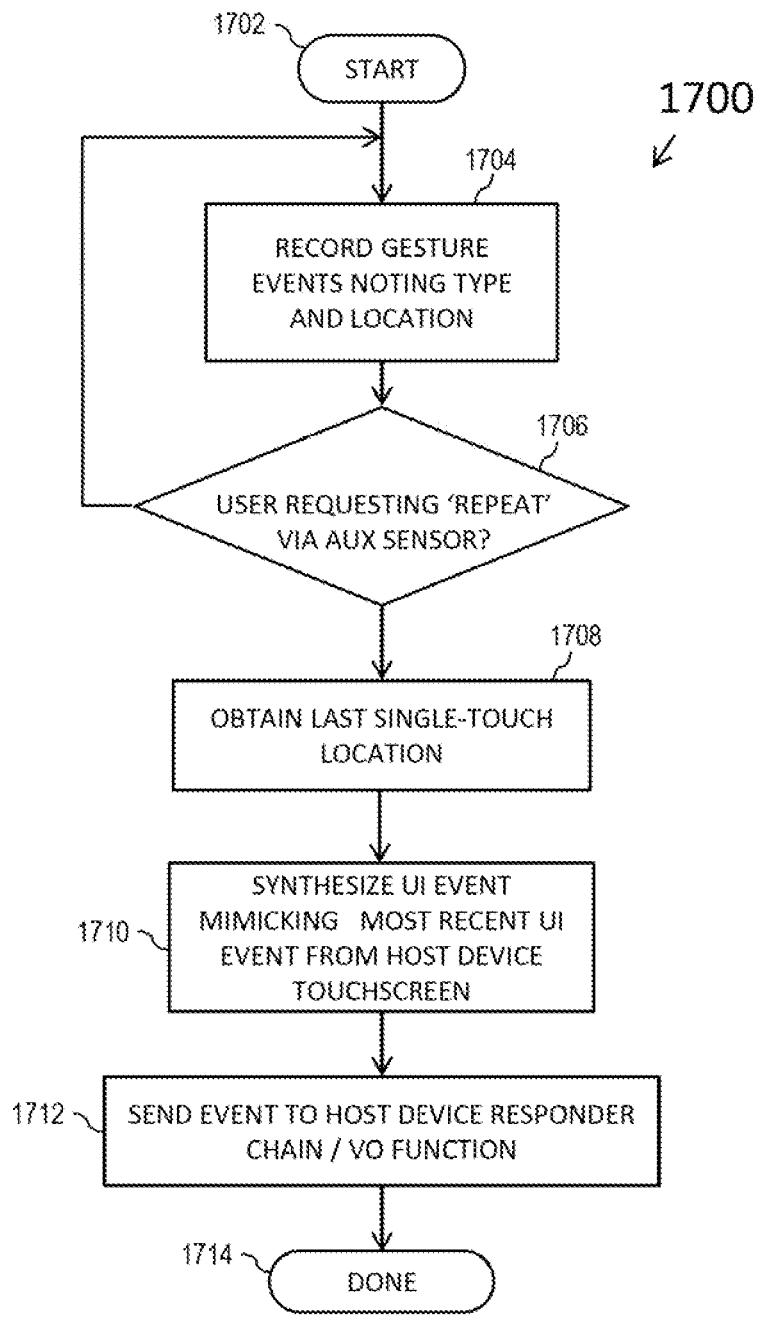
FIG. 17 depicts an example process, in accordance with principles described herein, for causing an audio accessibility process to repeat a previous utterance describing a user interface element.

FIG. 17 describes the steps in a process 1700 for implementing what may be called a 'repeat that' functionality for use in conjunction with an audible accessibility function such as VoiceOver function 514. More particularly, process 1700 represents an implementation assuming little to no integration with VoiceOver function 514 and which may be more likely executed as a part of helper function 516. Process 1700 commences in step 1702 wherein, either as device 100, auxiliary sensor 450, or other devices or processes are started, process 1700 begins monitoring user input events. Step 1704 represents an ongoing process of observing user interface events such as UI events 802 and recording the most recent types of events and their locations in screen coordinates. As shown in step 1706, this ongoing recording of gestures events continues until such time that the user actuates an auxiliary sensor to effectively request a repeat of the VoiceOver function's normal action in announcing a textual description of an element displayed.

Upon receiving this indication that the user is invoking a 'repeat that' functionality in step 1706, then execution proceeds to step 1708 to analyze the recent gestural UI events as recorded in step 1704 and to determine the last location that a single-touch gesture was received. This presumably corresponds to where the VoiceOver cursor should be indicating a highlighted element. Next, in step 1710, this information is used to synthesize a user interface event that mimics the most recent event notification that was a single-touch gesture as received from the host device touchscreen. This could be a tap or a sliding gesture, either of which would elicit an audible readout of descriptive information for a given element under the location where the screen was contacted in process 900, (See steps 930 through 938 for a description of this phenomenon.)

The next step in process 1700 is to dispatch the user event synthesized in step 1710 to the host device in step 1712. The user interface event will presumably go to the VoiceOver function and in a sense 'trick' it into reiterating the same utterance that was likely already presented. A user may find this 'repeat that' functionality useful in the event that the noise environment at the time of the initial readout prevented hearing the original announcement clearly. This may also be useful in the event that the user becomes distracted during the initial readout and simply needs to have it reiterated. In yet other cases, the variable quality of the text-to-speech translation may impact the ability of the user to recognize the speech clearly the first time around. After step 1712, process 1700 then concludes in step 1714.

Figure 18:
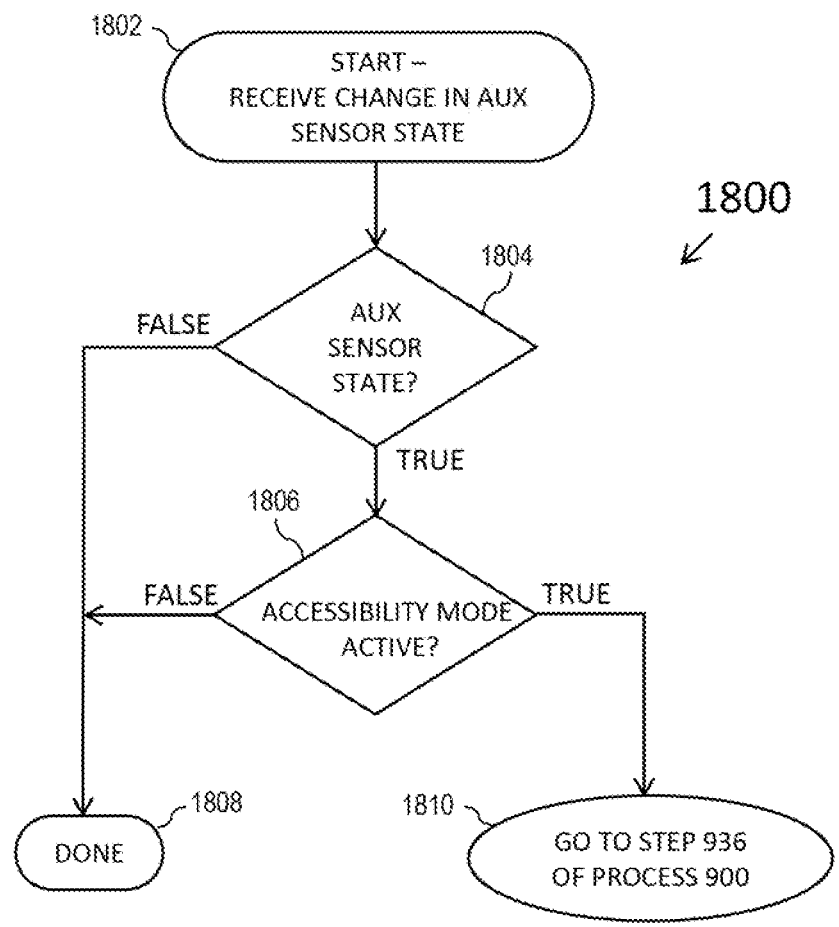
FIG. 18 depicts an alternative example process, in accordance with principles described herein, for causing an audio accessibility process to repeat a previous utterance describing a user interface element.

FIG. 18 illustrates an example process 1800 which, like process 1700, accomplishes a "repeat that" functionality or feature, but which assumes a tightly integrated implementation of the type depicted in FIG. 11. Process 1800 commences in step 1802 when a change in auxiliary sensor state is observed. Execution proceeds to step 1804 to determine the sense of the auxiliary sensor state. If the auxiliary sensor state is 'false' then no further action is taken by process 1800 and the process concludes in step 1808. Alternatively, if the determination in step 1804 is that the auxiliary sensor state is 'true', then execution proceeds to step 1806 to determine whether the audible accessibility mode is active. If not, then process 1800 simply concludes in step 1808.

Otherwise, if the accessibility mode is active then step 1810 is performed which simply refers to performing the same steps that were shown in process 900 starting with step 936. As indicated before, the auxiliary-aware accessibility process 1114 shown in FIG. 11 may operate in substantially the same as process 900 but may further be modified and adapted to process concurrent auxiliary sensor inputs. In the case of process 1800, the auxiliary sensor processing is able to cause a jump directly into a point of processing within process 900, something that would be unlikely to make happen from a separate process that can only operate through the pre-existing externalized interfaces of an existing accessibility application.

Figure 19:
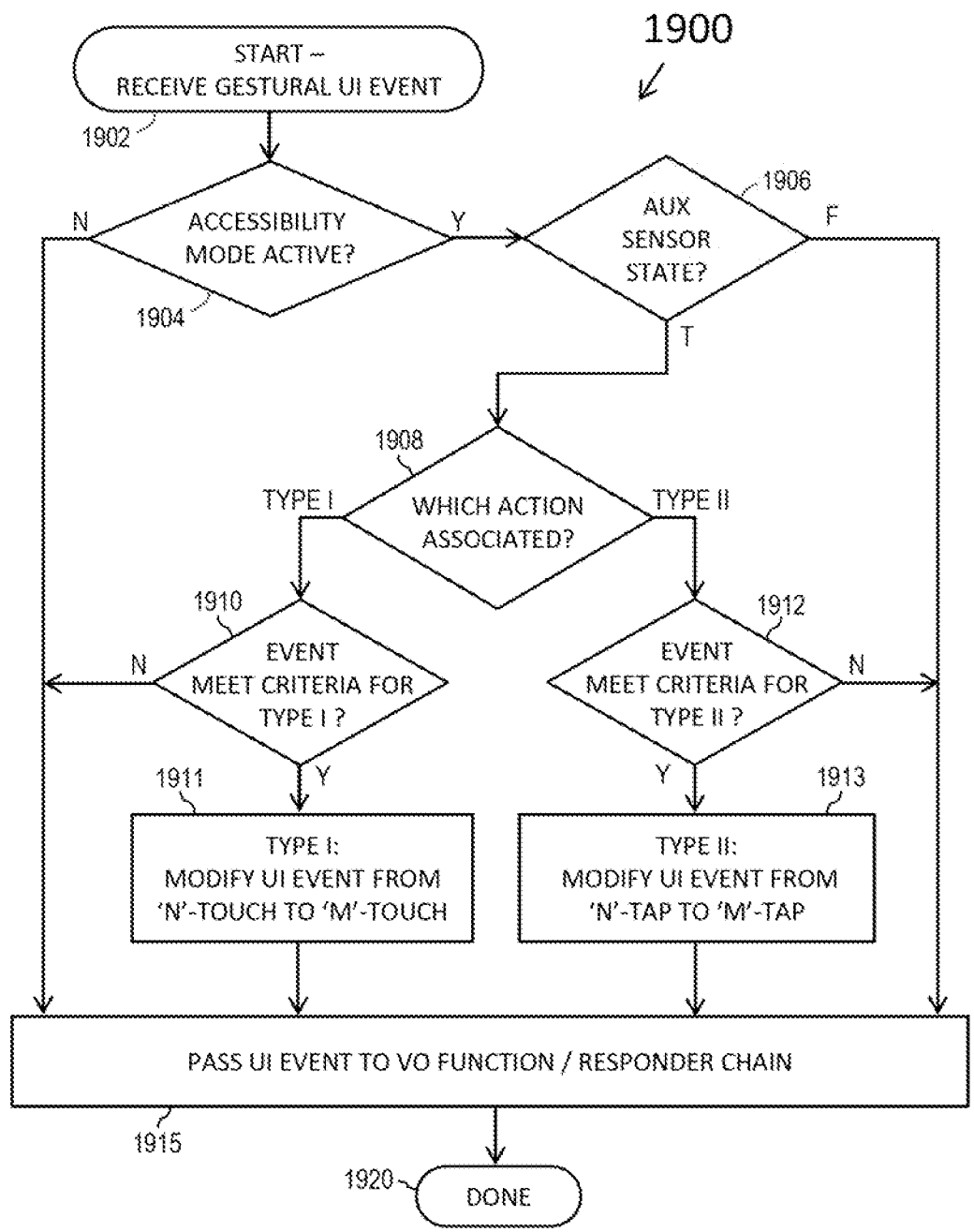
FIG. 19 depicts an example process, in accordance with principles described herein, in which actuating an auxiliary sensor dynamically alters specific parameters of user interface event notifications originating from a touchscreen.

FIG. 19 provides a diagram of a process 1900 for modifying or converting user interface events depending upon the state of an auxiliary sensor. Process 1900 commences in step 1902 upon receipt of a user interface event. Execution proceeds to step 1904 where it is determined whether or not the audible accessibility mode is active. If not, then execution proceeds with step 1915 to simply pass the user interface event to the usual processing by application elements via the responder chain.

Alternatively, if it is determined in step 1904 that the accessibility mode is active then execution proceeds step 1906 to determine the state of the auxiliary sensor which, if 'false', simply causes execution of 1908—again simply passing the user interface event along for processing by other functions. However, if, in step 1906, auxiliary sensor state is found to be 'true', then execution proceeds to step 1908 to determine what type of action is associated with the auxiliary sensor.

For convenience in the explanation of process 1900, two types of actions are presented, arbitrarily named 'Type I' and 'Type II'. In actuality, one may implement a different number and variety of different actions. The example 'Type I' branch in FIG. 19 accomplishes changing the apparent number of touch points within certain gesture descriptions. The example 'Type II' branch accomplishes changing the apparent number of taps within certain gesture descriptions. Step 1908 involves, for example, checking a variable, such as Aux_1_mapped_function 1125 introduced earlier, that may hold a value indicating whether a first type or second type of action is associated with a particular 'virtual button' of the auxiliary sensor that has been evaluated in step 1906.

If the 'Type I' branch is selected in step 1908, then execution continues with step 1910 to determine whether the gesture received in step 1902 qualifies to be modified. As a real example, a user may desire to use an auxiliary button to momentarily convert single-touch tap or slide gestures into equivalent three-touch gestures. When using VoiceOver mode, for example, this would allow a single finger gesture to control home screen scrolling instead of requiring three fingers. However, it may be desired that this conversion take place selectively on single-touch gestures, rather than 2-fingered ones, and only upon tap or slide gestures, ignoring double taps or other varieties. Therefore, step 1910 is performed to verify that the gesture event received conforms to specific criteria so that other types of gestures, such as 2-fingered gestures, are not inadvertently acted upon. These criteria may be encoded into a value or data structure as expressed or referenced by the contents of variable 1125, for example.

If it is determined in step 1910 that the incoming gesture event does not meet the criteria for being modified, then the event remains unchanged and is passed along in step 1915. Otherwise, if the gesture event does meet the criteria, then step 1910 is performed to effect the modification to the gesture-describing event data, in this case changing the event from a first number of touches 'N' to a second number of touches 'M'. The now-modified event is then passed onward in step 1915 and could next go to an audio accessibility function like VoiceOver if that mode is currently active in the device.

Returning to step 1908, if it is determined that the auxiliary sensor checked in step 1906 is associated with a 'Type II' action, then execution proceeds to step 1912 to, comparable to step 1910, evaluate the attributes of the gesture event and determine whether it should be modified. The 'Type II' branch changes a gesture event from a first number of taps 'N' to a second number taps 'M'.

As a real example, a user may configure an auxiliary 'virtual button' to simulate an 'explore mode' for vision-impaired users. While an auxiliary button is held in a 'true' state, single-touch gestures will be handled as such by VoiceOver. When the auxiliary button is not pressed, any single-touch tap gestures may automatically be converted to double-touch taps. Thus, a sighted user may act upon icons or simulated keyboard keys in the usual manner (though they will hear the audible output) without having to toggle the VoiceOver mode on and off. A blind user may immediately interact with the very same device, by grasping it as shown in FIG. 7B or 7D, and employ the familiar VoiceOver mode or similar accessibility paradigm without having to reconfigure the device or toggle any settings.

At step 1912, if the gesture event received in step 1902 is found to conform to the criteria, such as being a single-tap gesture, then step 1913 is executed to modify the event description in terms of the number of observed taps. (This may involve changing a 'number of taps' descriptor or, if the event only contains more raw description, altering the raw data to mimic a different number of taps.) Once the gesture event has been modified, then, as indicated in step 1915, the modified event is passed along to an accessibility function and/or the hosted application's element responder chain for processing. Regardless of which execution path occurs in process 1900, the process terminates in step 1920 after a gestural event message or object has been processed and forwarded in step 1915.

Figure 20:
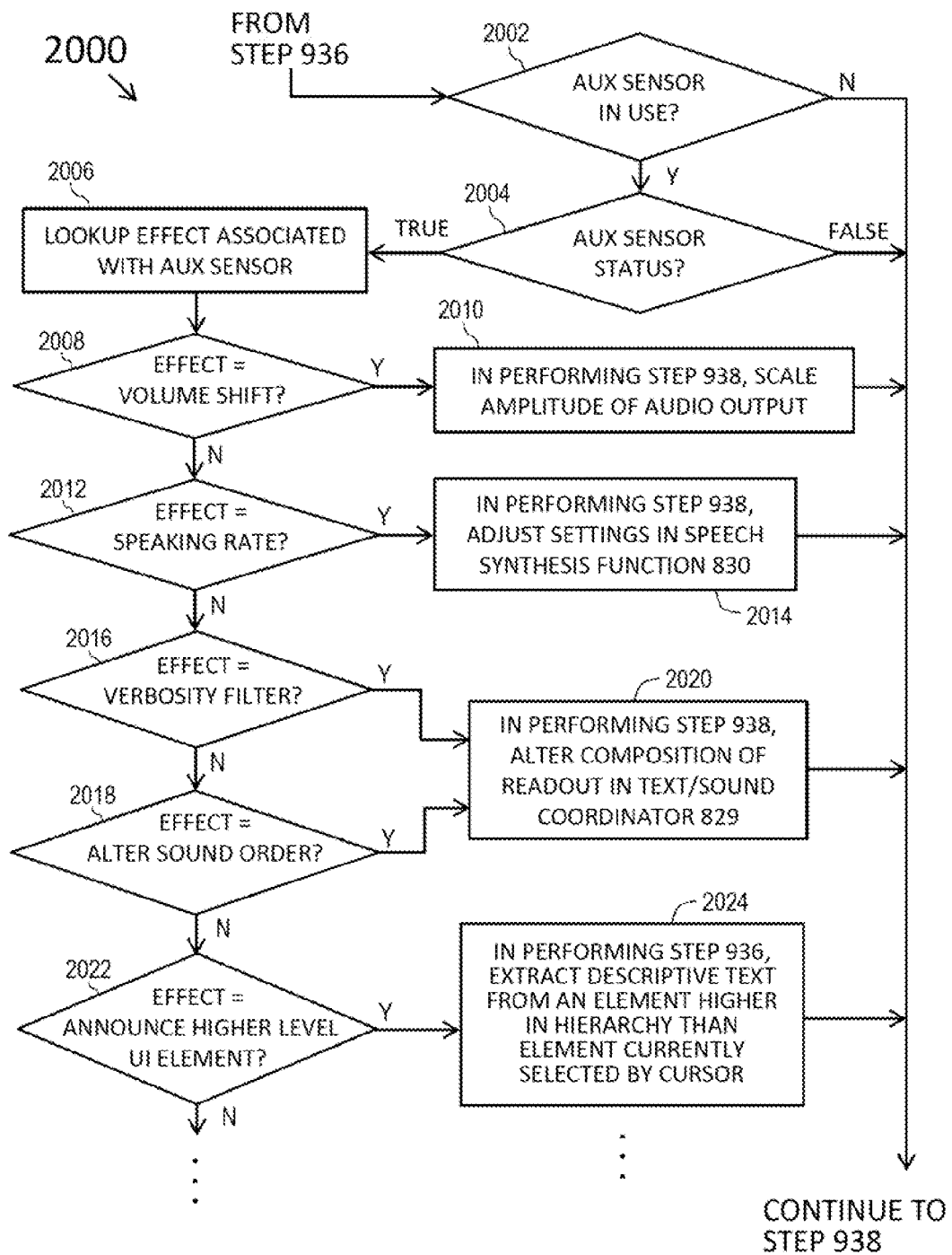
FIG. 20 depicts an example process, in accordance with principles described herein, by which actuating an auxiliary sensor alters the manner in which audible descriptive information is provided to a user.

FIG. 20 depicts a process 2000 that is achievable in a context such as FIG. 11, especially considering that the steps shown are to be inserted into process 900 between steps 936 and 938 to allow an auxiliary sensor to significantly and dynamically affect how descriptive sounds are to be presented to the user. Process 2000 is representative of one characteristic which accounts for the "auxiliary-aware" aspect of accessibility process 1114. Process 2000 commences in step 2002 to determine whether an auxiliary sensor is in use, such as whether an auxiliary sensor 450 is in communication with device 100 through a USB connection 530, a near-field wireless link or the like. Step 2002 may include analyzing user settings or establishing 'handshake' signals or performing other discovery protocols to determine whether an auxiliary sensor 450 is coupled for use with the host device. This determination may be related to reading or setting the value of state data item 1124 that was shown in FIG. 11.

If it is determined that no auxiliary sensor is in use, then execution simply proceeds with step 938 involving the normal readout of descriptive information along the lines of what Apple's VoiceOver mode currently performs. On the other hand, if it is determined in step 2002 that there is an auxiliary sensor in use, then execution proceeds step 2004 to determine the current state of that auxiliary sensor. If the state of the sensor is 'false', then execution simply continues with step 938 to continue processing in the usual sense.

Alternatively, if in step 2004 it is determined that the auxiliary sensory state is 'true'—meaning for example that a user is actuating an auxiliary sensor in a manner that was pictorially depicted in FIG. 7B or 7D—then execution proceeds to step 2006 to perform a 'lookup' to determine what desired effects are associated with the actuation of the auxiliary sensor.

Referring back to FIG. 11 and, in particular, data items 1125 and 1126, these variables may be used for holding values that are user-settable or programmatically configured so that one or more auxiliary sensors can each be associated with specific desired effects to occur as the accessibility process composes sounds for presentation to a user. Once the data retrieval has occurred to determine what effect is associated with an auxiliary sensor, then the remainder of the steps in process 2000 act to compare this value to defined values for different effects and direct process 2000 to perform specific adjustments or variations in processing to accomplish the desired effects.

For example, in step 2008, it is determined whether the auxiliary sensor is associated with a shift in volume. Preferably, this operates in such a manner that the pressing of an auxiliary sensor virtual button causes an immediate increase or decrease in volume, such as while descriptive readouts are occurring or at least affecting any subsequent readouts from the time that the virtual button is pressed and for the duration of the virtual button is pressed. This volume shift may be momentary or, alternatively, the pressing of the auxiliary button may toggle a volume shift that remains in effect at a new setting until toggled back. This feature is intended to facilitate use of the device when the volume may need to be lowered quickly out of regard for other people in the vicinity or may need to be boosted quickly to make up for a sudden increase in ambient noise conditions. The existing mechanisms for altering readout volume, for example using the volume control buttons on the device, only operate slowly and gradually, and then remain constant until changed whereas the feature implemented in steps 2008 and 2010 could more dynamically adjust the volume as needed and without requiring a change of grip while holding the device.

If it is determined in step 2008 that the actuation of the sensor is associated with volume shift, then execution proceeds to step 2010 to shift the amplitude of the audio output, such as by scaling the digitized values for the audio that is to be output. This shift can be performed in the course of executing step 938, although it may in fact be implemented anywhere within any of the audio-related functions and components described earlier.

If, in step 2008, it is determined that the effect associated with the auxiliary sensor that has been actuated in step 2004 is not the volume shift effect, then execution proceeds to step 2012 to determine if the desired effect is a shift in speaking rate. If so, then execution proceeds to step 2014 wherein, in performing step 938, settings are adjusted in the speech synthesis function 830, for example, to alter the rate at which speaking occurs. This is a commonly alterable parameter within speech synthesis software, it being noted that the default speaking rate can at least be changed from within the 'General Settings—Accessibility' menu on the iPhone as one example. Step 2014 refers to a more dynamic control of speaking rate as invoked by the user actuating the auxiliary sensor.

If the effect associated with the auxiliary sensor is neither volume shift nor speaking rate, then step 2016 is undertaken to determine whether the effect relates to a "verbosity filter". This refers to how much or how little information is provided as descriptive audible information is read out for each element that is being described. If the effect does relate to verbosity, then execution proceeds to step 2022 to affect how descriptive text is then composed into a text string for text-to-speech conversion and the coordination between speech utterances and sound effects that are presented to the user. The descriptive text will have been retrieved from applications as was described for the application accessibility data retrieval function 1128 and/or the text and sound coordinator 1129.

A user may be very familiar with some parts of a particular application or user interface and need only very compact descriptive readouts so that they can move more quickly across the page. In a similar vein, and as indicated by step 2018, some users may prefer to hear the descriptive information in a different sequence to facilitate their navigation. In summary, the net action of steps 2016 and 2020 are to cause the text and sound coordinator 829 to vary the amount of descriptive information that is provided to the user, and especially to dynamically shift this on the fly in response to actuation of an external sensor.

Step 2018 in conjunction with step 2020 is intended to allow a user to dynamically alter the order in which information is presented descriptive information is presented to them, such as hearing a control element type before hearing the name of the control. An additional test for the action associated with the auxiliary sensor is reflected in step 2022 wherein the value extracted in step 2006 is examined to see if it corresponds to the effect being an announcement of a higher-level element rather than specifically the element currently highlighted by a VoiceOver cursor or the like. This feature was exemplified in FIG. 7D shown earlier. If that is the effect that the auxiliary sensor is mapped to, then execution proceeds to step 2024.

Step 2024 represents a notable differentiation from the default operation of, for example, Apple's VoiceOver functionality and would require internal changes represented by the audible accessibility process reflected in FIG. 11. Step 2024 essentially involves performing a functionality similar to what was done in step 936 except further probing the hierarchy of user interface elements to determine a higher level 'parent' or 'owner' or 'superview' of the currently selected element, such as an entire displayed page, and then using the descriptive text from that element to augment the overall description provided to the user. As described earlier in conjunction with FIG. 7D, this can be very useful for dynamically providing further context information as the user needs it. The ellipsis shown at the bottom of FIG. 20 is intended to reflect that still further effects settings, and the associated actions to implement those effects, may be handled similarly to the example effects list so far.

In some embodiments described herein, the principles described herein may be usefully employed in the context of existing host devices, operating systems and applications without requiring change or redesign to the same. The user of a touchscreen may enjoy increased multiplicity in interpretable gestures as well as 'hot key' functionality tied to useful features. Application developers are also enabled to design auxiliary-aware applications that may incorporate auxiliary sensor input.

The following co-pending U.S. Patent Applications are hereby incorporated by reference in their entireties: "Auxiliary Sensor for Touchscreen Device" Ser. No. 13/837,715 filed on even date herewith; and "Apparatus for Detecting Proximity of Object near a Touchscreen" Ser. No. 13/836,716.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a limiting sense.

What is claimed is:

1. A method comprising:
   from at least one auxiliary sensor device that is attached to a computing device as a removable outer housing surrounding a touchscreen of the computing device, receiving at the computing device a communication indicating an actuation state of the auxiliary sensor device;
   obtaining descriptive information for a graphical user interface element displayed under the touchscreen;
   responsive to a touch gesture received at the touchscreen included with the computing device, producing a first audio signal, based on the descriptive information, from the computing device if the actuation state of the auxiliary sensor device corresponds to a first state; and
   responsive to the touch gesture, producing a second audio signal, based on the descriptive information, from the computing device, different from the first audio signal, if the actuation state of the auxiliary sensor device corresponds to a second state different from the first state,
   wherein the first and second audio signals each include speech utterances, and the first and second audio signals are different from one another based at least on the first and second audio signals including different speech utterances,
   wherein the first audio signal includes first speech utterances that describe a function of the graphical user element, and the second audio signal includes second speech utterances that describe the function of the graphical user element, the second speech utterances providing a more detailed description of the function of the graphical user interface than the first speech utterances.

2. The method of claim 1, wherein the descriptive information comprises descriptive text and wherein the method further comprises:
   converting the descriptive text into at least one synthesized speech utterance; and,
   including the synthesized speech utterance in the first and second audio signals.

3. The method of claim 1, wherein the first audio signal comprises a first sound followed by a second sound and wherein the second audio signal includes the second sound followed by the first sound.

4. The method of claim 1, wherein the first audio signal comprises a first set of two or more sounds and wherein the second audio signal comprises a subset of the sounds in the first set of sounds.

5. The method of claim 1, further comprising:
determining at least one effect, from among a plurality of selectable effects; and
applying the effect to cause the second audio signal to substantially differ in amplitude from the first audio signal.

6. The method of claim 1, further comprising:
determining at least one effect, from among a plurality of selectable effects, wherein applying the effect causes the speech utterance as rendered in the second audio signal to exhibit a different speaking rate than the speech utterance as rendered in the first audio signal.

7. A method comprising:
from at least one auxiliary sensor device that is attached to a computing device as a removable outer housing surrounding a touchscreen of the computing device, receiving at the computing device a communication indicating an actuation state of the auxiliary sensor device;
obtaining descriptive information for a graphical user interface element displayed under the touchscreen;
responsive to a touch gesture received at the touchscreen included with the computing device, producing a first audio signal, based on the descriptive information, from the computing device if the actuation state of the auxiliary sensor device corresponds to a first state; and
responsive to the touch gesture, producing a second audio signal, based on the descriptive information, from the computing device, different from the first audio signal, if the actuation state of the auxiliary sensor device corresponds to a second state different from the first state,
wherein the first and second audio signals each include speech utterances, and the first and second audio signals are different from one another based at least on the first and second audio signals including different speech utterances,
wherein the first audio signal includes first speech utterances that describe a function of the graphical user element and the second audio signal includes second speech utterances that describe a type of the graphical user element.

8. The method of claim 7, further comprising:
determining at least one effect, from among a plurality of selectable effects; and
applying the effect to cause the second audio signal to substantially differ in amplitude from the first audio signal.

9. The method of claim 7, further comprising:
determining at least one effect, from among a plurality of selectable effects, wherein applying the effect causes the speech utterance as rendered in the second audio signal to exhibit a different speaking rate than the speech utterance as rendered in the first audio signal.

10. The method of claim 7, further comprising:
executing in the computing device, an audible accessibility process that receives event data objects describing touchscreen user input events and affects the producing of audio signals by the computing device:
instantiating at least one event data object pertaining to the touch gesture;
responsive to the actuation state of the auxiliary sensor device corresponding to the first state, providing the event data object to the audible accessibility process such that the first audio signal is produced; and
responsive to the actuation state of the auxiliary sensor device corresponding to the second state, performing a modification upon the event data object and providing the event data object, as modified, to the audible accessibility process such that the second audio signal is produced as a result of the modification.

11. A system comprising:
an auxiliary sensor device coupled to a computing device as a removable outer housing surrounding a touchscreen interface of the computing device; and
a computing device including:
at least one processor executing instructions of an operating system and one or more applications;
the touchscreen interface, the touchscreen interface being coupled to the processor and operable to communicate gestural user input to the processor;
at least one display visible through the touchscreen and controlled by the processor;
at least one communications interface coupled to the auxiliary sensor device and operable to communicate auxiliary sensor state to the processor; and
at least one audio subsystem producing audio signals under control of the processor;
wherein the processor operates to:
obtain auxiliary sensor state information via the communications interface;
obtain descriptive information for a graphical user interface element displayed by the display;
receive at least one instance of gestural user input via the touchscreen interface; and
responsive to receiving the at least one instance of gestural user input, controlling the audio subsystem to selectively produce a first audio signal, based on the descriptive information, if the auxiliary sensor state corresponds to a first state and to selectively produce a second audio signal, based on the descriptive information, if the auxiliary sensor state corresponds to a second state,
wherein the first and second audio signals each include speech utterances and the first and second audio signals are different from one another based at least on the first and second audio signals including different speech utterances,
wherein the first audio signal includes first speech utterances that describe a function of the graphical user element and the second audio signal includes second speech utterances that describe a type of the graphical user element.

12. The system of claim 11, wherein the processor operates to:
convert the descriptive information into at least one synthesized speech utterance; and,
control the audio subsystem to include the synthesized speech utterance in the first and second audio signals.

13. The system of claim 11, wherein the first audio signal comprises a first sound followed by a second sound and wherein the second audio signal includes the second sound followed by the first sound.

14. The system of claim 11, wherein the first audio signal comprises a first set of two or more sounds and wherein the second audio signal comprises a subset of the sounds in the first set of sounds.

15. The system of claim 14 wherein the first set of two or more sounds comprises at least one sound that is a speech utterance.

16. A system comprising:
an auxiliary sensor device coupled to a computing device as a removable outer housing surrounding a touchscreen interface of the computing device; and a computing device including:
- at least one processor executing instructions of an operating system and one or more applications;
- the touchscreen interface, the touchscreen interface being coupled to the processor and operable to communicate gestural user input to the processor;
- at least one display visible through the touchscreen and controlled by the processor;
- at least one communications interface coupled to the auxiliary sensor device and operable to communicate auxiliary sensor state to the processor; and
- at least one audio subsystem producing audio signals under control of the processor;
- wherein the processor operates to:
  - obtain auxiliary sensor state information via the communications interface;
  - obtain descriptive information for a graphical user interface element displayed by the display;
  - receive at least one instance of gestural user input via the touchscreen interface; and
  - responsive to receiving the at least one instance of gestural user input, controlling the audio subsystem to selectively produce a first audio signal, based on the descriptive information, if the auxiliary sensor state corresponds to a first state and to selectively produce a second audio signal, based on the descriptive information, if the auxiliary sensor state corresponds to a second state,
- wherein the first and second audio signals each include speech utterances and the first and second audio signals are different from one another based at least on the first and second audio signals including different speech utterances,
- wherein the first audio signal includes first speech utterances that describe a function of the graphical user element and the second audio signal includes second speech utterances that describe the function of the graphical user element, the second speech utterances providing a more detailed description of the function of the graphical user interface than the first speech utterances.

17. The system of claim 16, wherein the processor additionally operates to:
- determine at least one effect, from among a plurality of selectable effects, and
- applying the effect to cause the second audio signal to substantially differ in amplitude from the first audio signal.

18. The system of claim 16, wherein the processor additionally operates to:
- determine at least one effect, from among a plurality of selectable effects, wherein applying the effect causes the speech utterance as rendered in the second audio signal to exhibit a different speaking rate than the speech utterance as rendered in the first audio signal.

19. The system of claim 16, wherein the processor executes an audible accessibility process, operable to receive event data objects describing user input and to affect the producing of the first and second audio signals, and further operates to:
- instantiate at least one event data object pertaining to the instance of gestural user input;
- responsive to the auxiliary sensor state corresponding to the first state, providing, to the audible accessibility process, the event data object to the audible accessibility process such that the first audio signal is produced; and
- responsive to the auxiliary sensor state corresponding to the second state, performing a modification upon the event data object and providing the event data object, as modified, to the audible accessibility process such that the second audio signal is produced as a result of the modification.

* * * * *